United States Patent [19]
Juri

[11] Patent Number: 5,355,167
[45] Date of Patent: Oct. 11, 1994

[54] ORTHOGONAL TRANSFORM CODING APPARATUS

[75] Inventor: Tatsurou Juri, Osaka, Japan

[73] Assignee: Matsushita Electric Industrial Co., Ltd., Osaka, Japan

[21] Appl. No.: 741,047

[22] Filed: Aug. 6, 1991

[30] Foreign Application Priority Data

Aug. 6, 1990 [JP] Japan ................................. 2-208605

[51] Int. Cl.$^5$ ............................................. H04N 7/133
[52] U.S. Cl. .................................... 348/405; 348/397; 348/408; 348/420
[58] Field of Search ................ 358/133, 135, 136, 138, 358/13; 348/405, 408, 420, 397; H04N 7/133

[56] References Cited

U.S. PATENT DOCUMENTS

| | | | |
|---|---|---|---|
| 4,821,119 | 4/1989 | Gharavi | 358/136 |
| 5,073,821 | 12/1991 | Juri | 358/133 |
| 5,109,451 | 4/1992 | Aono | 358/133 |

FOREIGN PATENT DOCUMENTS

| | | | |
|---|---|---|---|
| 0207774A3 | 1/1987 | European Pat. Off. | H04N 7/133 |
| 026759A3 | 5/1988 | European Pat. Off. | H04N 7/133 |
| 0267578A1 | 5/1988 | European Pat. Off. | H04N 7/133 |
| 0401854A2 | 12/1990 | European Pat. Off. | H04N 7/133 |

OTHER PUBLICATIONS

"Adaptive Image Data Compression", Zuniga et al., 1979 IEEE, pp. 583–590.
"Rate Adaptive Communication", Andrew G. Tescher, The Aerospace Corp. NTC 1978 Nat. Telecommunications Cnoference, pp. 19.1.1–19.1.6.

*Primary Examiner*—Howard W. Britton
*Attorney, Agent, or Firm*—Wenderoth, Lind & Ponack

[57] ABSTRACT

In an orthogonal transfrom coding apparatus for performing high efficiecy coding using orthogonal transformation, a plurality of quantizers are provided; the coded amount of data of the plurality of quantizers are respectively calculated; an optimum quantizer to make the amount of data less than a specific value is selected to quantize the coded amount of data, and the quantized values are encoded in a variable-length form and the transmitted.

21 Claims, 18 Drawing Sheets

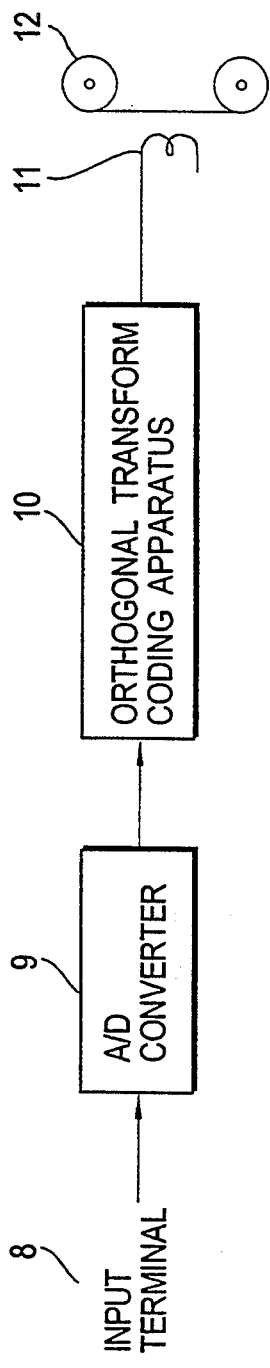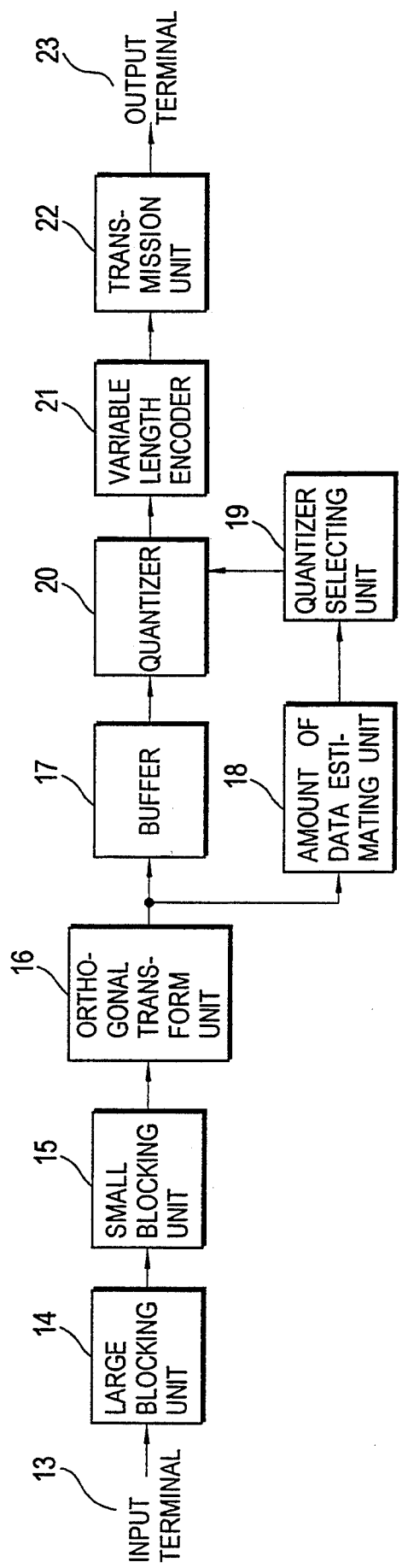

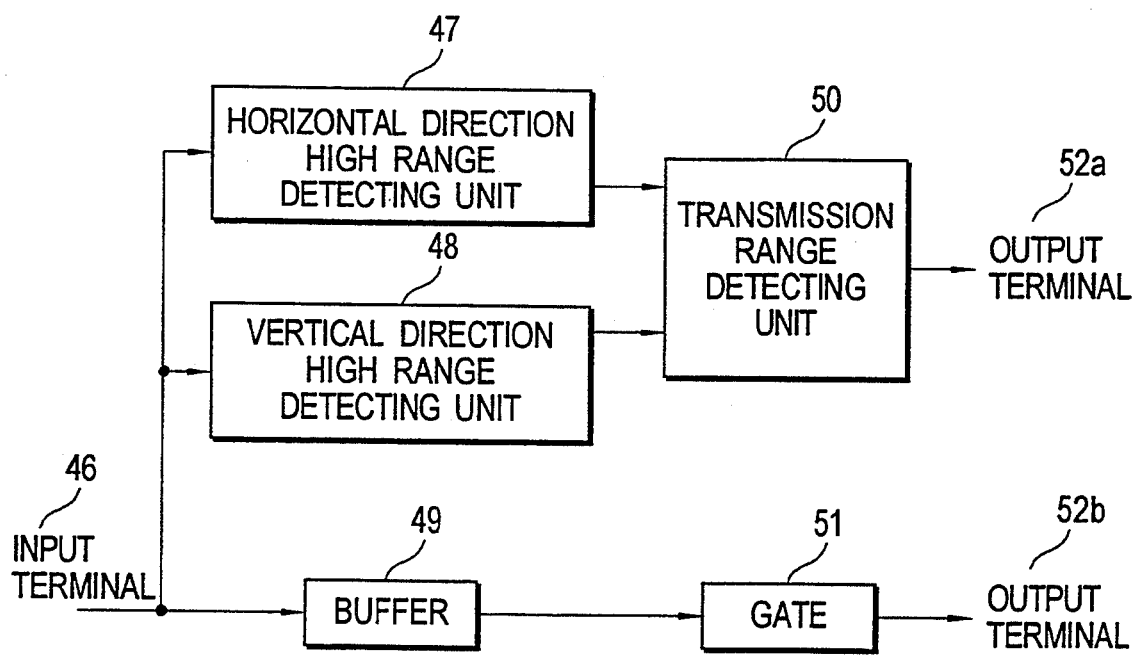

FIG. 11
PRIOR ART

LOW FREQUENCY RANGE

HORIZONTAL DIRECTION
HIGH FREQUENCY RANGE

VERTICAL DIRECTION HIGH FREQUENCY RANGE

|   | 0 | 1 | 2 | 3 | 4 | 5 | 6 | 7 |
|---|---|---|---|---|---|---|---|---|
| 0 | 1 | 3 | 4 | 10 | 11 | 21 | 22 | 36 |
| 1 | 2 | 5 | 9 | 12 | 20 | 23 | 35 | 37 |
| 2 | 6 | 8 | 13 | 19 | 24 | 34 | 38 | 49 |
| 3 | 7 | 14 | 18 | 25 | 33 | 39 | 48 | 50 |
| 4 | 15 | 17 | 26 | 32 | 40 | 47 | 51 | 58 |
| 5 | 16 | 27 | 31 | 41 | 46 | 52 | 57 | 59 |
| 6 | 28 | 30 | 42 | 45 | 53 | 56 | 60 | 63 |
| 7 | 29 | 43 | 44 | 54 | 55 | 61 | 62 | 64 |

ORTHOGONAL TRANSFORM CODING APPARATUS

BACKGROUND OF THE INVENTION

1. Field of the Invention

This invention relates to an orthogonal transform coding apparatus for high-efficiency coding of picture signals.

2. Description of Prior Art

High-efficiency encoding has become important with the development of digital technology for use with picture signals. As an example of the high efficiency encoding technology, orthogonal transform coding has been known, in which time sequential signals to be inputted are transformed to orthogonal components such as, for example, frequency components. As the orthogonal transformation, a Fourier transformation, a discrete cosine transformation (hereinafter abbreviated as DCT) and a Hadamard transformation are well known. Especially, DCT has been considered as the orthogonal transform technology suitable for processing picture information.

An example of high efficiency coding will be explained below by referring to FIG. 29 showing an example of a conventional high efficiency encoding apparatus using a DCT. In FIG. 29, element 1 is an input terminal; element 2 is a blocking unit; element 3 is a DCT unit; element 4 is an adaptive quantizer; element 5 is a variable length encoder; element 6 is a data buffer, and element 7 is an output terminal.

A digital image signal inputted from the input terminal 1 is sent to the blocking unit 2 to be separated into blocks on a DCT unit basis. In the high efficiency encoding of image pictures, a two dimensional DCT for a block constructed of a total of 64 picture elements made of horizontal 8 pixels and vertical 8 pixels is often used. The thus blocked image signals are subjected to the two dimensional DCT by the DCT unit 3 to be transformed into DCT components. The thus obtained DCT components are quantized by the adaptive quantizer 4, and then subjected to variable length coding by the variable length encoder 5 and adjusted to a predetermined rate by the data buffer 6 and sent to the output terminal 7.

The variable length encoding is a way of coding in which a codeword of a higher generation probability is assigned a shorter code and a codeword of a lower generation probability is assigned a longer code. Table 1 shows the correspondence between three bit data 0, 1, 2, 7 and their variable length codes. In this example, numbers 0 and 1 are assigned a 2 bit code; numbers and 3 are assigned a three bit code, and numbers 4, 5, 6, and 7 are assigned a 4 bit code.

TABLE 1

| Data | Variable Length Code |
|---|---|
| 0 | 0 0 |
| 1 | 0 1 |
| 2 | 1 0 0 |
| 3 | 1 0 1 |
| 4 | 1 1 0 0 |
| 5 | 1 1 0 1 |
| 6 | 1 1 1 0 |
| 7 | 1 1 1 1 |

Since the DCT components usually show an exponential distribution, the general probability of 0 and 1 is considerably larger than that of 4, 5, 6 and 7, and the average number of bits after encoding is smaller than 3 bits. In this case, however, it is noted that when the variable length encoding is used, the data rate after encoding may change depending on the picture quality. As a result, in the conventional apparatus shown in FIG. 29, in order to prevent an overflow or underflow in the data buffer 6, the adaptive quantizer 4 increases the quantization width when the amount of data in the data buffer 6 is increased and decreases the quantization width when the data amount is decreased.

The conventional high efficiency coding apparatus using a DCT has the following problems:

(1) Since the variable length encoding is used, if an error bit occurs, code synchronization is disturbed, although it depends on the transmission line, and the decoding of data is prevented. Such a transmission error causes the picture quality to be greatly deteriorated. Therefore, it is difficult to employ the conventional DCT apparatus particularly in devices in which transmission errors can occur with a high probability such as in a VCR.

(2) In order to maintain the data rate at a constant value, a feed-back system using a buffer is conventionally used. However, actual image data is unbalanced and it is difficult to obtain the optimum coding by the feed-back technique. Particularly, when the amount of data of the front half of a picture image is small and that of the rear half is large, unnecessary data is assigned to the front half, and the amount of data for the rear half is reduced, resulting in a remarkable degradation in the picture quality.

In order to solve these problems of the conventional apparatus, applicants have invented and proposed an apparatus in which the amount of data after encoding is estimated before quantizing to determine an optimum quantization and the variable length encoding can be completely achieved in a small range (see U.S. Pat. No. 5,073,821, issued Dec. 17, 1991).

SUMMARY OF THE INVENTION

An apparatus for orthogonal transform coding in accordance with is invention comprises: a large blocking means for assembling sample values of input signals to form a large block of the sampled input signals; a small blocking means for dividing the large block formed in the large blocking means into a plurality of small blocks; an orthogonal transform means for orthogonally transforming the signals in each of said plurality of small blocks thus blocked; a plurality of kinds of quantizers each quantizing the orthogonally transformed components obtained by the orthogonal transform means; amount of data estimating means for calculating an amount of data obtained after the coding by the quantization is make in each quantizer; a quantizer selecting means for selecting a quantizer whose amount of coded data for every small block is optimum in a large block using the coded amount of data for each quantizer calculated by the amount of data estimating means; a quantizing means for quantizing orthogonally transformed components in the large block using the quantizer thus selected by the quantizer selecting means; a variable length encoding means for performing a variable length encoding of the quantized values obtained by the quantizing means, and a transmission means for transmitting the variable-length coded word obtained by the variable length encoding means and information of the quantizer to be used.

In the orthogonal transform coding apparatus as mentioned above, the amount of data estimating means has an amount of data storing means for calculating the coded amount of data for said plurality of quantizers prepared for each small block and for storing the thus calculated result in a memory. The quantizer selecting means selects, based on the amount of data for the plurality of quantizers for each small block being stores in the amount of data estimating means, quantizers for every small block in such a manner that the amount of data to be quantized becomes either the maximum amount of data not exceeding the actually transmittable amount of data or the minimum amount of data exceeding the actually transmittable amount of data in the large block unit.

Further, the quantizer selecting means perform the steps of estimating the amount of data obtained by the quantizer producing approximately the n/2th amount of data of the quantized value in a case where there are n quantizer candidates, selecting only a quantizer producing an amount of data smaller than an amount of data produced by the quantizer which has been subjected to the data estimation in a case where the estimated quantized amount of data is larger than a transmittable amount of data, and on the contrary, in a case where the estimated quantized amount of data is smaller than the transmittable amount of data; selecting only a quantizer producing an amount of data larger than the amount of data produced by the quantizer which has been subjected to the data estimation, whereby the amount of quantizer candidates is approximately halved, and repeats the above-mentioned process so as to select and optimum quantizer.

Still further, the quantizer selecting means perform the steps of dividing the small blocks included in a large block into a front half including quantizers from the top one to the jth one and a rear half of the remainder, selecting one quantizer from each of the front half and rear half so as to produce the nearest quantized values to each other, and transmitting the coded value and the information of the quantizers thus selected in the front half and rear half and of the number j.

In a case where there are n quantizer candidates and m small blocks in a large block, assuming that the amount of data in the jth small block of the ith quantizer is expressed as D(i,j), if D(i,j)>D(i-1,j) when 1<i<n, the amount of data storing means stores first D(o,j) for the m small blocks into a memory, next, if S(i,j)=-D(i,j)−D(i-1,j) when 1<i<n, the amount of data storing means stores S(i,j) into the memory successively in regard to i, the quantizer selecting means reads and adds D(o,j) in the m small blocks successively from 0 to m−1 in regard to j, then, to the result thus obtained are successively added S(i,j) in the order of S(0,0) S(0,1) ... S(0,m−1), S(1,0) ..., S(n−1,m−1) is i and j with respect to the equation S(i,j) when the result thus obtained exceeds the detected transmittal amount of data, an ith quantizer is selected for the small blocks from the 0th up to (j−1)th or jth small block, and an (i−1)th quantizer is selected for the small blocks coming thereafter.

In a case where there are n kinds of quantizers and m small blocks included in a large block, assuming that the amount of data in the jth small block of the ith quantizer is expressed as D(i,j), if D(i,j)>D(i−1,j) when 1≦i<n, the amount of data storing means stores S (i−j)=D (i, j)−D (i−1, j ) for the m small blocks into a memory successively in regard to i, simultaneously stores a sum AD(i) which is the total amount of data of the m small blocks corresponding to each quantizer in regard to i, the quantizer selecting means first compares the sum AD(i) with the transmittable amount of data in regard to i of being 1≦i<n the maximum AD(k) not exceeding the transmittal amount of data and K are fetched, next, to said maximum AD(k) are successively added S(k+1,j) in the order of j=0,1. . ., m−1, j with respect to the equation S(k+1,j) when the result thus added exceeds the detected transmittable amount of data, a (k+1)th quantizer is selected for the small blocks from 0th to (j−1)th or jth small block, and a kth quantizer is selected for the small blocks coming thereafter.

The transmission means re-arranges the quantized values of a small block in a transmission region made by the smallest square (hereinafter defined as the transmission region) in the order from the low frequency value to the high frequency value in both horizontal and vertical directions so as to include all of the non-zero values with the quantized value representing the lowest frequency component as one apex (origin), and transmits only the coded word of the quantized values included in the transmission region and information on the transmission region.

Also, the transmission means re-arranges the quantized values of a small block in the order from the lowest frequency value to the highest frequency value in both horizontal and vertical directions, and transmits the coded word of the quantized values representing from the lowest frequency component up to the highest frequency component in both horizontal and vertical directions in the order from the coded word of the quantized values representing the low frequency value, and does not transmit the coded word of the quantized values coming after the quantized value representing the highest non-zero frequency value using the end signal or information capable of determining the position of the last quantized value. In this case, the variable length encoding means encodes the quantized value with the code length 2K+1 or 2K for the quantized value the figure number of the absolute value of which is K, and the amount of data estimating means calculates the amount of data of the coded quantized values in the small blocks of one quantizer according to the following:

$$2 \times \Sigma Ki + M$$

where, Ki is the figure number of the absolute value of the ith quantizer, and M is the number of quantized values to be transmitted.

Further, the variable length encoding means encodes the quantized value with the code length 1 for the quantized value 0 and the amount of data estimating means calculates the amount of data of the coded quantized values in the small blocks of one quantizer according to the following:

$$\Sigma(Ni-1) + M$$

where, Ni is a code length of the ith quantized value, and M is the number of quantized values to be transmitted.

The quantizing means sorts the orthogonally transformed components into r groups including from a group representing the high frequency level up to a group representing the low frequency level, and prepares s kinds of quantization widths, and thus, all of the quantizers performing quantization in combination with the r groups of the orthogonally transformed components with the s kinds of quantization widths.

BRIEF DESCRIPTION OF THE DRAWINGS

FIG. 1 is a block diagram showing a digital VCR using this invention.

FIG. 2 is a block diagram showing an example of an orthogonal transform coding apparatus in accordance with this invention.

FIGS. 6 to 9 are respectively block diagrams showing examples of the orthogonal transform unit used in the apparatus of this invention.

FIGS. 10–12 are block diagrams showing examples of the transmission unit used in the apparatus of this invention.

DESCRIPTION OF THE PREFERRED EMBODIMENTS

Figure 3:
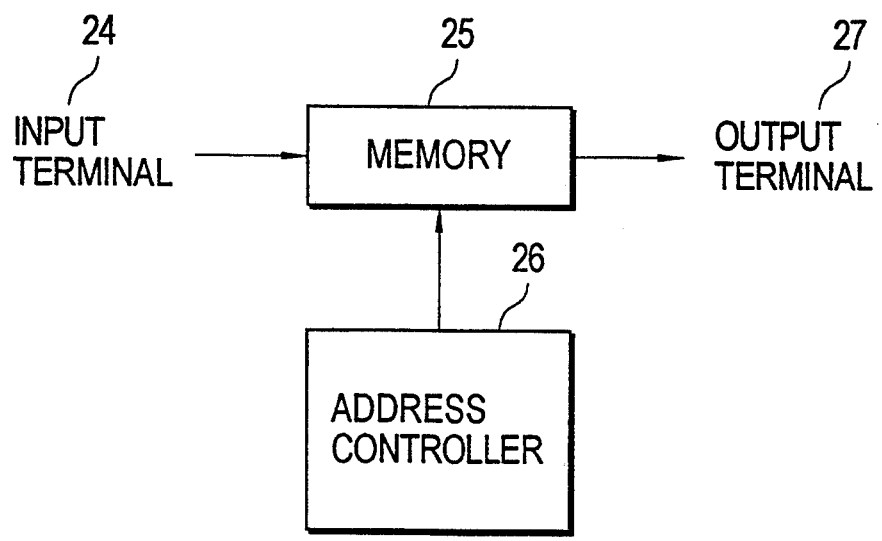
FIGS. 3 to 5 are block diagrams showing examples of the large block unit used in the apparatus of this invention.

First, outlines of a device in which this invention is applied will be shown by referring to the block diagram shown in FIG. 1, in which a digital VCR is used as an example. In FIG. 1, element 8 is an input terminal; element 9 is an A/D converter; element 10 is an orthogonal transform coding apparatus according to this invention; element 11 is a magnetic head, and element 12 is a magnetic tape. Television signals inputted from the input terminal 8 are converted into sample values of digital picture signals by the A/D converter 9. The thus converted digital picture signal sample values are subjected to data compression by the orthogonal transform coding apparatus 10 and then recorded by the magnetic head 11 on the magnetic tape 12. To employ the orthogonal transform apparatus of this invention in a picture recording device or picture transmission device such as a digital VCR enables a decreased data rate and provides longer recording time.

FIG. 2 is a block diagram of an orthogonal transform coding apparatus according to this invention.

In FIG. 2, element 13 is an input terminal; element 14 is a large blocking unit; element 15 is a small blocking unit; element 16 is an orthogonal transform unit; element 17 is a data buffer; element 18 is an amount of data estimating unit; element 19 is a quantizer selecting unit; element 20 is a quantizer; element 21 is a variable length encoder; element 22 is a transmission unit, and element 23 is an output terminal. Picture signals inputted from the input terminal 13 are divided by the large clocking unit 14 into a plurality of large blocks each of which comprises a plurality of sample values. Each of large blocks is further divided by the small blocking unit 15 into a plurality of small blocks each being formed in a rectangular shape on the picture plane thereof. The small-blocked sample values are orthogonally transformed by the orthogonal transform unit 16. The thus orthogonally transformed orthogonal components are sent to the buffer 17 and data amount estimating unit 18 on a large block unit basis. In the data amount estimating unit 18, the amount of data os coded orthogonal components in every small block is calculated for a plurality of quantizers prepared in advance; then, one of the quantizers is selected for every small block by the quantizer selecting unit 19 based on the result of the calculation. At the same time, the orthogonal components inputted into the buffer 17 are delayed until the quantizer is selected. The orthogonal components sent from the buffer 17 are quantized in the selected quantizer 20 by the quantizer selection unit 19 and the thus quantized orthogonal components are subjected to variable length coding by the variable length encoder 21. The quantized value coded in the variable length form is sent through the transmission unit 22 to the output terminal 23.

As explained above, in this invention, by estimating the amount of data before quantization, it becomes possible to select the optimum quantizer. Also, since it is possible to accurately control the amount of data differently from the feed-back control used in the prior art, it becomes possible to encode the data in the variable length form of a constant length of a small range; thus, the variable length encoding is able to be employed in digital VCRs in which transmission errors occur frequently.

Detailed explanations follow on respective components shown in FIG. 2.

The large blocking unit 14 is explained first by referring to FIG. 3 showing a block diagram thereof. FIG. 3 is a block diagram showing a first example of the large blocking unit shown in FIG. 2.

Figure 4:
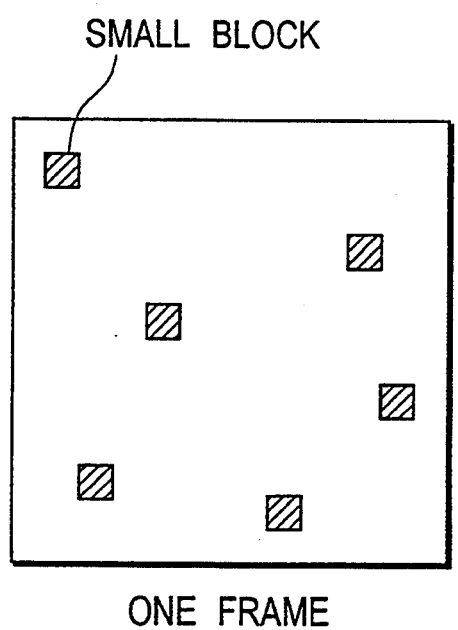

In FIG. 3, element 24 is an input terminal; element 25 is a memory; element 26 is an address controller, and elements 27 is an output terminal. The sample value inputted from the input terminal 24 is sent to the memory 25 and outputted to the output terminal 27 according to the control of the address controller 26. As shown above, in the large blocking unit 14, the input signals are stored in the memory 25 and outputted for every large block. FIG. 4 is a diagram for explaining the operation of the large blocking unit shown in FIG. 2. In FIG. 4, shaded areas show small blocks. An assembly of the shaded small blocks forms a large block. In this embodiment, the large block is formed by assembling small blocks situated at various positions on the picture plane in a shuffling manner. As a result, the amount of information contained in the respective large blocks is substantially equal to each other since the amount of information on the picture plane is scattered. Accordingly, even if there are deviations in the amount of information depending on positions on the picture plane, it is possible to compress the data with a high efficiency. Moreover, since the data rate of compressed codewords can be averaged, it is easy to control the amount of data to be constant on a large block unit basis. Such blocking can be effected by controlling the output address in the address controller 26 shown in FIG. 3.

Figure 5:
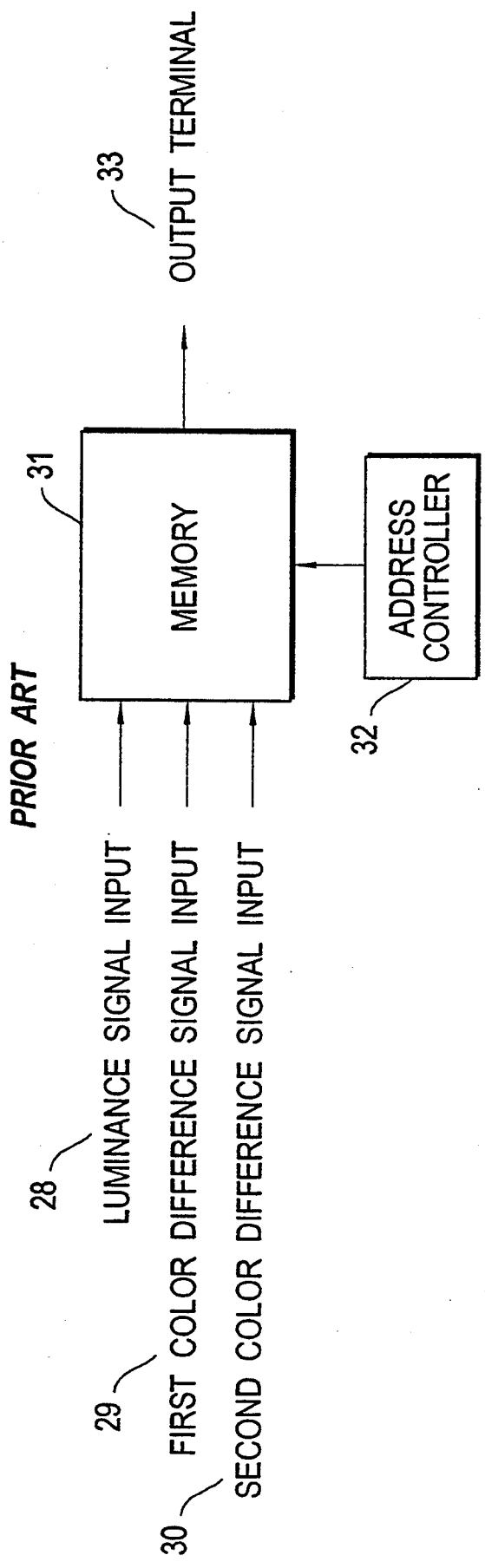

FIG. 5 is a block diagram showing a second example f the large blocking unit shown in FIG. 2 In FIG. 5, element 28 is a luminance signal input terminal; element 29 is a first color difference signal input terminal; element 30 is a second color difference signal input terminal; element 31 is a frame memory; element 32 is an address controller, and element 33 is an output terminal. Sample values inputted from the luminance signal input terminal 28, first color difference signal input terminal 29 and second color difference signal input terminal 30 are inputted to the frame memory 31 and outputted to the output terminal 32 according to the control by the address controller 32. In the second example shown in FIG. 5, each of the large blocks is formed by the luminance signals, the first color difference signals and second color difference signals containing them substantially at the same rate. In general, the amount of information of the luminance signals and the color difference signals is unbalanced. Since each large block contains the same rate of the luminance signals and the first and second color difference signals, it becomes possible to average the amount of information similar to the first example of the large blocking unit 14. When the input signals are R, G, and B signals, the amount of information can be averaged by forming all of the large blocks so as to contain the R, G, and B signals substantially at the same rate.

Next, the small blocking unit 15 will be explained below, which divides the sample values of each of the large blocks into blocks for orthogonal transformation. The circuit for the small blocking comprises a memory and an address controller substantially the sam as the circuit for the large blocking as shown in FIG. 3. However, it is noted that the small blocking unit basically forms a two-dimensional block or a three-dimensional block including the time axis in accordance with the orthogonal transformation, thus being possible to use a decreased capacity of memory compared to that in the large blocking unit. In practical use, the large blocking unit and the small blocking unit may comprise one memory and one address controller to decrease the circuit scale, and the processing order of the small blocking and the large blocking can be exchanged. Similar to the large blocking unit, the small blocking unit may be formed by various shapes.

Figure 6:
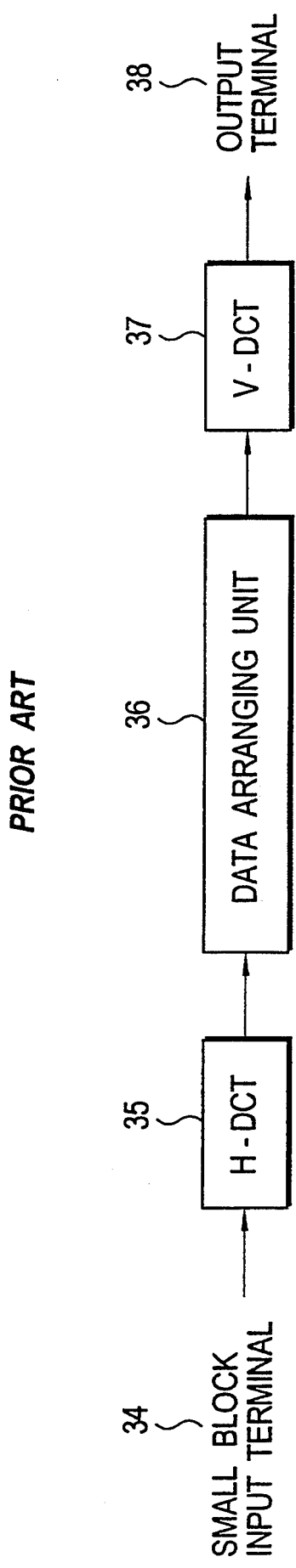

The orthogonal transform coding unit 16 is explained as follows. For the sake of brevity, an example of orthogonal transformation is made by the discrete cosine transformation (DCT) using a small block consisting of 64 pixels of horizontal 8 pixels × vertical 8 pixels on the picture plane is typically explained. FIG. 6 is a block diagram showing an example of the orthogonal transform coding unit 16 shown in FIG. 2. In FIG. 6, element 34 is an input terminal of the sample value of the small block; element 35 is a horizontal DCT unit; element 36 is a data arranging unit; element 37 is a vertical DCT unit, and element 38 is an output terminal. The sample value small-blocked in the small blocking unit 15 in FIG. 2 is inputted through the input terminal 34 shown in FIG. 6 into the orthogonal transform coding unit 16 and discretely transformed in the horizontal direction by the horizontal DCT unit 35. The orthogonal components transformed by the DCT unit 35 are arranged in the vertical direction in the data arranging unit 36. The thus arranged orthogonal components are discretely transformed in the vertical direction in the DCT unit 37 and outputted to the output terminal 38. Both the horizontal and vertical orthogonal components for every small block which have been subjected to the DCT transformation in the horizontal direction and vertical direction are inputted to the buffer 17 and the data amount estimating unit 18 shown in FIG. 2 in the order of the orthogonal components representing the low frequency range.

Although the above examples are described in connection with a two-dimensional DCT, in this invention, various kinds of DCTs can be employed, and a three-dimensional orthogonal transformation containing the time axis direction can be used. The simplest example of the three-dimensional orthogonal transformation is shown in FIG. 8.

Figure 8:
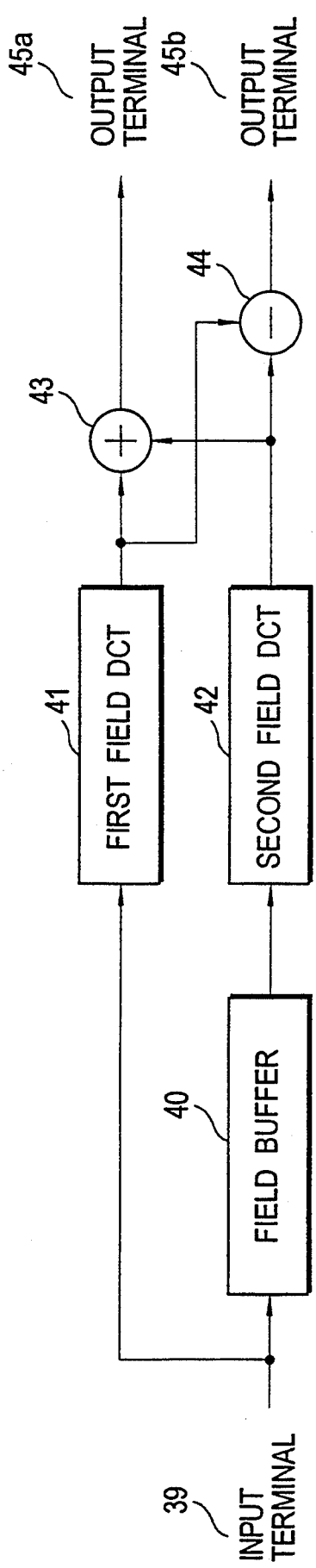

In FIG. 8, element 39 is an input terminal; element 40 is a field buffer; element 41 is a first field DCT unit; element 42 is a second field DCT unit; element 43 is an adder; element 44 is a subtractor, and elements 45a and 45b are output terminals. The signals inputted from the input terminal 39 are subjected to a two-dimensional DCT transformation in the first DCT unit 41 and are also inputted simultaneously to the field buffer 40. The signal delayed by one field by the field buffer 40 are subjected to a two-dimensional DCT in the second field DCT 42. The output signals from the first field DCT unit 41 and second field DCT unit 42 are added in the adder 43 and subtracted in the subtracted 44 and the results of both calculations are outputted to the output terminals 45a and 45b. In the example shown in FIG. 8, the DCT transformed orthogonal components between two different fields situated at the same spatial position on the picture plane are added on one hand and subtracted on the other hand. In this case, the added components are quantized in the quantizer having a small quantization width and the subtracted components are quantized in the quantizer having a large quantization width, so that it becomes possible to compress the data amount while suppressing the visual distortion of the picture. To calculate the sum and difference of the data is a lowest dimensional (two-dimensional) orthogonal transformation, but it becomes possible to employ higher orthogonal transformations by using information of more fields.

Figure 7:
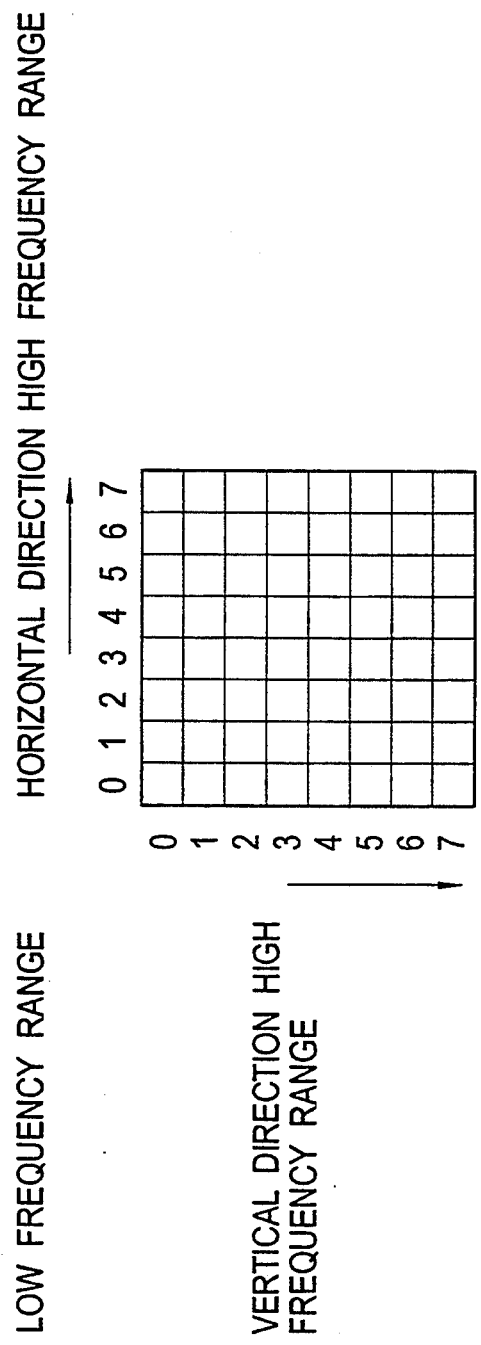

A method which does not need the field buffer 40 can be provided in which the input of the three-dimensional DCT shown in FIG. 8 is made after being subjected to a non-interlaced transformation in the large blocking. At the same time, the three-dimensional DCT of (8×4×2) as shown in FIG. 8 and the two-dimensional DCT of (8×8) being subjected to a non-interlaced transformation as shown in FIG. 7 can be switched depending on the movement between the fields.

The transmission unit 22 shown in FIG. 2 will be explained below. A first example of the transmission unit 22 is explained by referring to FIG. 9 showing the quantized values of the orthogonal components which are subjected to a two-dimensional orthogonal transformation. The transmission unit 22 is adapted to transmit only the portion surrounded by the smallest rectangle (the portion surrounded by the solid lines in FIG. 9) containing all of only non-zero quantized values with the lowest frequency components (the quantized values at the position of horizontal 0 and vertical 0 and hereinafter called the origin) in the horizontal direction and vertical direction as an apex. It is noted, in this case, that the data on the origin is always transmitted. Accordingly, the transmission range of this block (the rectangular range in FIG. 9) is decided by the position of the quantized value representing the non-zero highest frequency components in each of the horizontal and vertical directions. The number of quantized values to be transmitted is decided by the area of the transmission range, so that it can be easily calculated by the product of the position of the highest frequency in the horizontal direction and the highest frequency in the vertical direction. In this example, the information of the transmission range can be represented by the horizontal coordinate 3 bits and the vertical coordinate 3 bits, being 6 bits in total. As a result, the data amount after the coding of each small block is the sum of the variable length coded word contained in the transmission range and the information of the transmission range. Next, the structure of the first example of the transmission unit 22 will be explained below by referring to FIG. 10.

In FIG. 10, element 46 is an input terminal; element 47 is a horizontal direction high range detecting unit; element 48 is a vertical direction high range detecting unit; element 49 is a buffer; element 50 is a transmission range detecting unit; element 51 is a gate, and elements 52a and 52b are output terminals. The quantized values inputted from the input terminal 46 are applied to the horizontal direction high range detecting unit 47 and vertical direction high range detecting unit 48. In the horizontal direction high range detecting unit 47, a position is detected where the highest frequency component of non-zero quantized value in the horizontal direction exists. In the vertical direction high range detecting unit 48, a position is detected where the highest frequency component of non-zero quantized value in the vertical direction exists. The thus detected position is made the origin of the rectangular shape shown in FIG. 9. Using the outputs of the horizontal direction high range detecting unit 47 and vertical direction high range detecting circuit 48, the transmission range detecting unit 50 sends only the quantized values in the transmission range to the output terminal 52b through the gate 51 among the quantized values to be delayed by the buffer 49. At the same time, the transmission range detecting unit 50 outputs the information representing the transmission range to output terminal 52a.

FIG. 11 shows the transmission order of a second example of the transmission unit of this invention. In the second example, the orthogonally transformed components are encoded in the order of the numbers shown in FIG. 11 from the lowest frequency component in both the horizontal direction and vertical direction in the small block and transmitted. The coded words after the quantized value representing the non-zero highest frequency are replaced by the codeword representing the transmission end signal. By this process, since it is possible to concentrate the high range values which have high generation probability of 0 to the rear half, it makes possible to elongate the length of the consecutive 0s. Instead of the transmission end signal shown above, information representing the final coded word may be used. Also, the transmission orders other than this are available in practical use.

Figure 12:
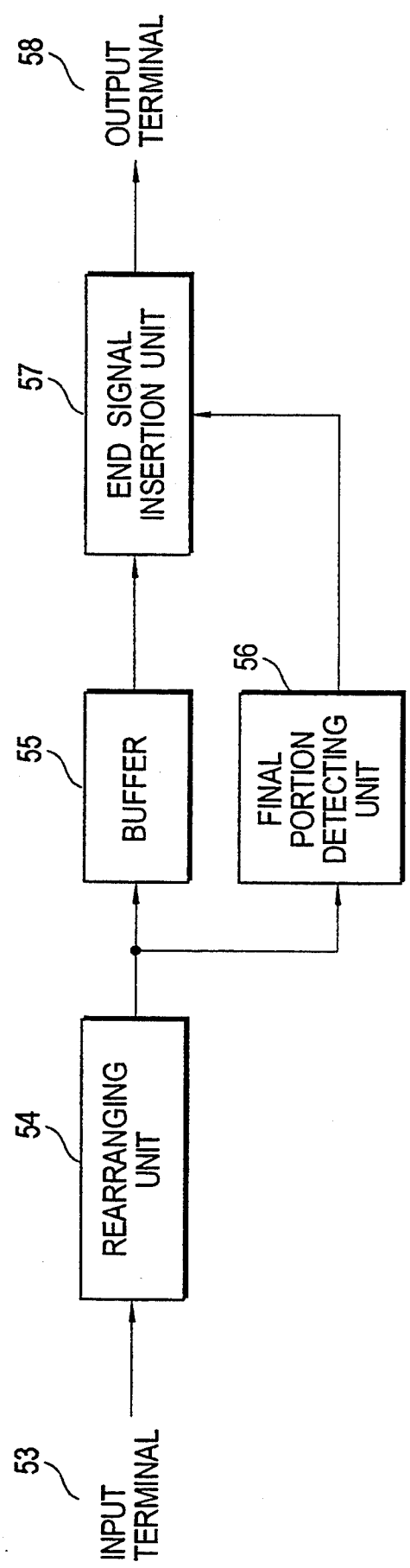

FIG. 12 shows the transmission unit of the second example. In FIG. 12, element 53 is an input terminal; element 54 is a rearranging unit; element 55 is a buffer; element 56 is a final portion detecting unit; element 57 is an end signal insertion unit, and element 58 is an output terminal. The quantized values inputted from the input terminal 53 are re-arranged in the order shown in FIG. 11 in the re-arranging unit 54 and sent to the buffer 55. The final portion detecting unit 56 detects the portion of the non-zero final quantized value among the quantized values thus re-arranged. The quantized values outputted from the buffer 55 have the final consecutive quantized values of 0 replaced by the end signal in the end signal insertion unit 56 according to the information from the final portion detecting unit 56 and sent to the output terminal 58.

Figure 13:
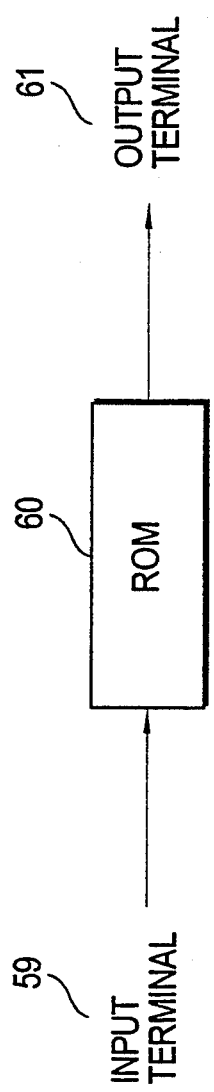
FIGS. 13, 16, 17, and 18 are block diagrams showing examples of the variable length encoding unit used in the apparatus of this invention.

Next, explanations will be made below on the variable length encoding unit shown in FIG. 2 by referring to FIG. 13 which is a block diagram of the first example thereof. In FIG. 13, element 59 is an input terminal; element 60 is a ROM (Read Only Memory), and element 61 is an output terminal. The quantized values outputted from the input terminal 59 are encoded in a variable length manner by the ROM 60 and outputted to the output terminal 61. An example of the variable length encoding is explained below using the circuit shown in FIG. 13.

In a first example of the variable length encoding unit, such a code that the code length is 1 bit for the quantized value 0 is used.

Figure 14:
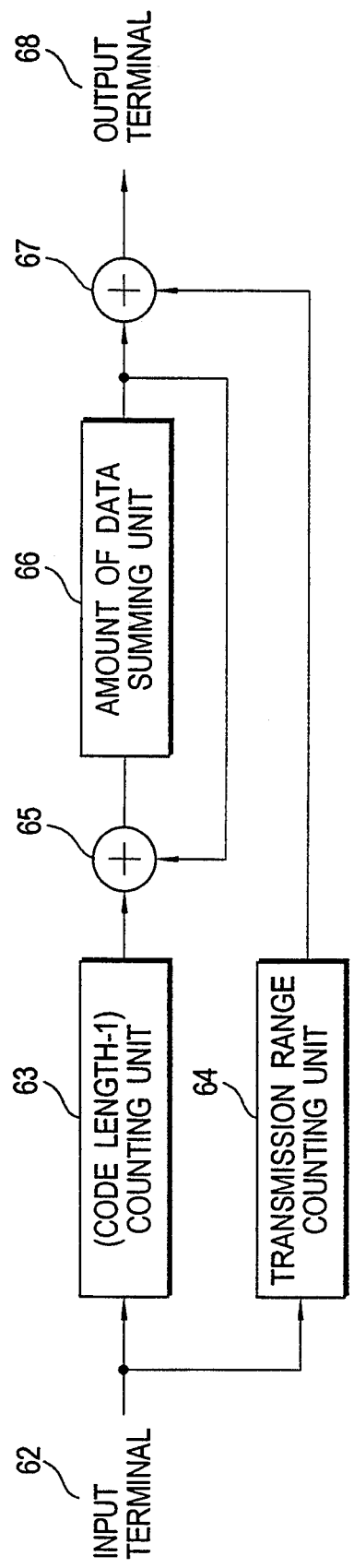
FIGS. 14 and 15 are block diagrams showing examples of the amount of data estimating unit used in the apparatus of this invention.

A first example of the data amount estimating unit for calculating the data amount when the variable length encoding unit as shown above is used is shown in FIG. 14. In FIG. 14, element 62 is an input terminal; element 63 is a (code length−1) counting unit; element 64 is a transmission range counting unit; element 65 is an adder; element 66 is an amount of data summing unit; element 67 is an adder, and element 68 is an output terminal. The orthogonally transformed components inputted from the input terminal 62 are supplied to the (code length−1) counting unit 63 for calculating the value of (code length−1). The output from the (code length−1) counting unit 63 is added to the total amount of data of the (code length−1) of the previous (code length−1) data amount outputted from the amount of data summing unit 66 and the amount of data of the total value is supplied again to the amount of data summing unit 66. Simultaneously, in the transmission range counting unit 64, the number of codewords to be actually transmitted is counted and the value thus counted is added to the sum of the (code length−1) outputted from the amount of data summing unit 66 in the adder 67 and then, outputted to the output terminal 68. The first variable length encoding unit makes the code length equal to 1 for the quantized value of 0. As a result, the value of the (code length−1) becomes 0. Accordingly, the sum of the (code length−1) for all of the input signals and the number of codewords to be transmitted is equal to the sum of the code length of the signal to be transmitted. Therefore, the calculation of the amount of data and the calculation of the transmission range can be made simultaneously, there is no need to detect the transmission range in advance. As a result, it becomes possible to halve the time of the data amount estimation. Next, a second example of the variable length encoding unit shown in FIG. 2 will be explained using Table 2. The quantized values to be inputted are expressed in binary form as:

$(S, X_7, X_6, X_5, X_4, X_3, X_2, X_1, X_0)$.

S is a bit for the sign of plus and minus and $X_0$ to $X_7$ represent binary values of the absolute value of the quantized values $X_7$ is the most significant position and $X_0$ is the least significant position The quantized values represented by 9 bits are encoded in a variable length manner according to the rule shown in Table 2. In this example, it can be encoded into the variable length code without any complicated calculation. As a result, it becomes possible to encode without using an ROM shown in FIG. 13

TABLE 2

Variable Length Encoding

| Quantized value to be inputted | Variable length code word |
|---|---|
| $X_0 = \ldots = X_7 = 0$ | 0 |
| $X_0 = 1, X_1 = \ldots = X_7 = 0$ | 1 0 S |
| $X_1 = 1, X_2 = \ldots = X_7 = 0$ | $110 X_0 S$ |
| $X_2 = 1, X_3 = \ldots = X_7 = 0$ | $1110 X_0 X_1 S$ |
| $X_3 = 1, X_4 = \ldots = X_7 = 0$ | $11110 X_0 X_1 X_2 S$ |
| $X_4 = 1, X_5 = \ldots = X_7 = 0$ | $111110 X_0 X_1 X_2 X_3 S$ |
| $X_5 = 1, X_6 = \ldots = X_7 = 0$ | $1111110 X_0 X_1 X_2 X_3 X_4 S$ |
| $X_6 = 1, X_7 = 0$ | $11111110 X_0 X_1 X_2 X_3 X_4 x_5 s$ |
| $X_7 = 1$ | $11111111 S_0 X_1 X_2 X_3 X_4 X_5 X_6$ |

In the second example, the code length $N_i$ for the number of figures $K_i$ of the absolute value of the quantized value is expressed as:

$$Ni = 2 \times Ki + 1.$$

Thus, the code length for the quantized values can be easily calculated.

Figure 15:
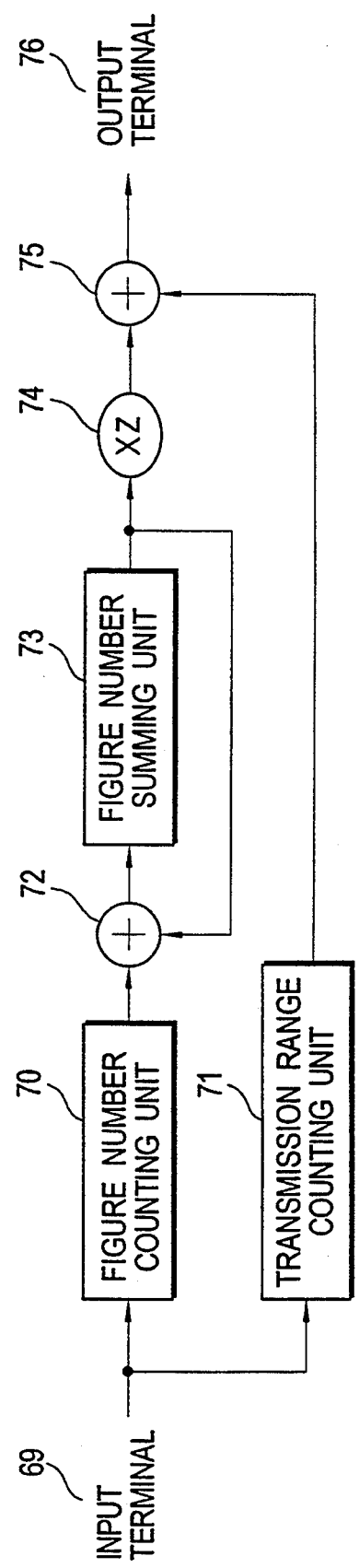

FIG. 15 is a second example of the amount of data estimating unit for the second variable length encoding unit. In FIG. 15, element 69 is an input terminal, element 70 is a figure number counting unit; element 71 is a transmission range counting unit; element 72 is an adder element; 73 is a figure number summing unit; element 74 is a doubler; element 75 is an adder, and element 76 is an output terminal. The figure number counting unit 70 calculates the figure number of the absolute value of the quantized values of the orthogonally transformed components inputted from the input terminal 69. The output of the figure number counting unit 71 is added in the adder 72 to the total value of the respective figure numbers which have been summed from the previous signals before being outputted from the figure number summing unit 73 and the thus obtained summed value is inputted again to the figure number summing unit 73. Simultaneously, in the transmission range counting unit 71, the number of codewords to be actually transmitted is calculated and the calculated number is added to the value obtained by doubling by the doubler 74 the total number of figures outputted from the figure number counting unit 73 in the adder 75 and outputted to the output terminal 76. In the second variable length encoding unit, since the code length is expressed as (twice the figure number of the quantized value+1), the data amount can be easily estimated.

Figure 16:
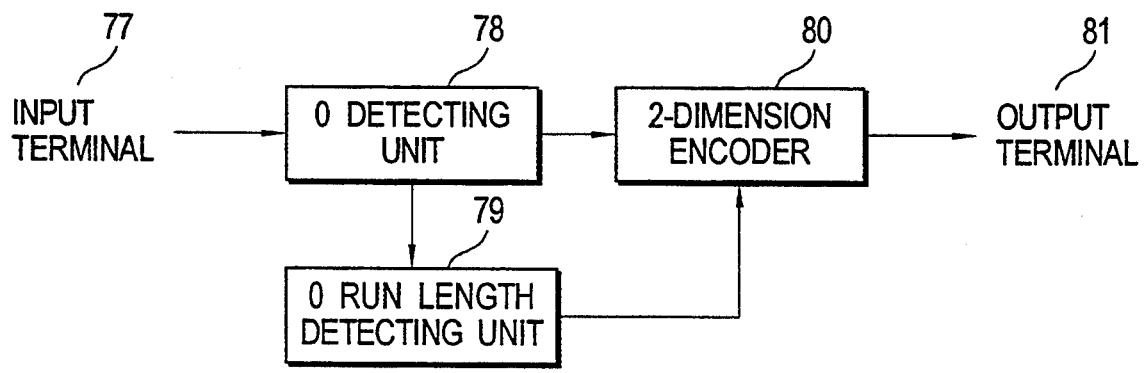

Next, a third example of the variable length encoding unit shown in FIG. 2 will be explained below. Almost orthogonally transformed components are 0. As a result, the probability of consecutive generation of 0s of 0s of the quantized values is high. Thus, by encoding the length of the consecutive 0s of the quantized values in the run length code, the data amount can be compressed (in this case, the run length shows the length of consecutive 0s). Furthermore, by encoding the length of consecutive 0s of the quantized values and the first non-zero quantized value following thereto collectively as one codeword, more effective compression becomes possible. This coding method is called 2 dimensional encoding. The third variable length encoding unit is explained by referring to FIG. 16. In FIG. 16, element 77 is an input terminal; element 78 is a 0 detecting unit; element 79 is a 0 run length detecting unit; element 80 is a 2 dimension encoding unit, and element 81 is an output terminal. The quantized values inputted from the input terminal 77 are subjected to the detection whether or not each of the quantized value is 0 in the 0 detecting unit 78. If the quantized value is 0, the previous run length value summed in the 0 run length detecting unit 79 is added to 1. When a non-zero quantized value is detected in the 0 detecting unit 78, the 2 dimension encoding unit 80 performs the 2 dimension encoding by using the non-zero quantized value thus detected and the 0 run length value obtained from the 0 run length detecting unit 79 and outputs the 2 dimensional code thus obtained to the output terminal 81, while the run length value summed in the 0 run length detecting unit 79 is reset to 0. Thus, even when the generation probability of 0 is high, the data amount can be more efficiently compressed.

Figure 17:
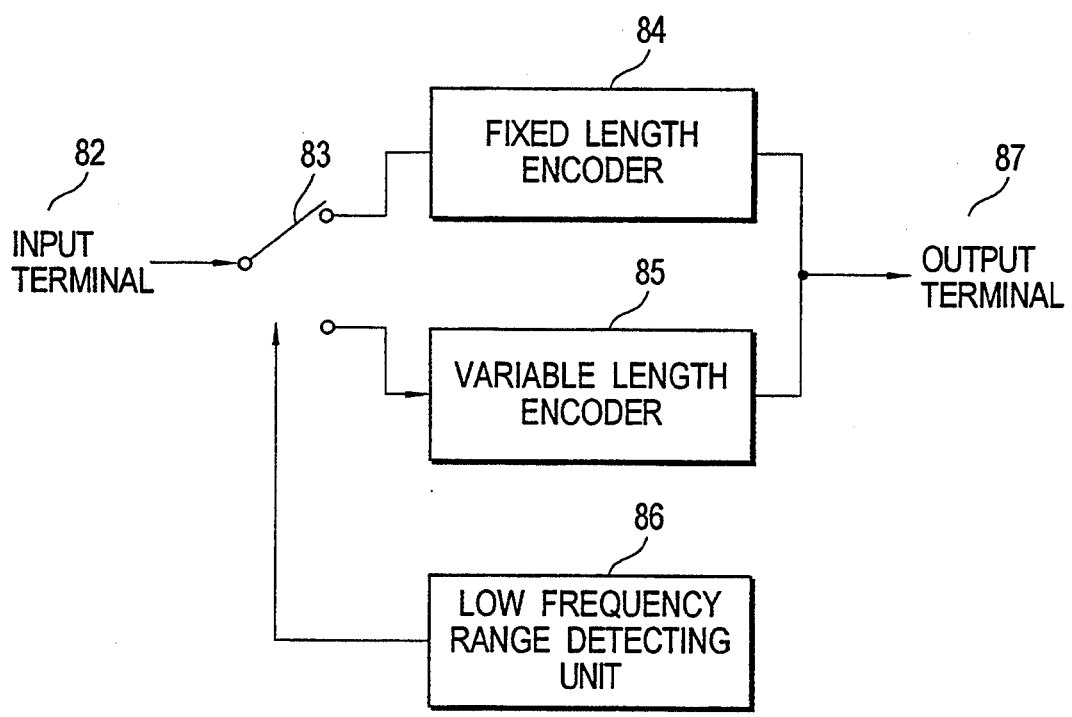

Next, a fourth example of the variable length encoding unit as shown in FIG. 2 will be explained below. In general, in picture information, energy is high in the low frequency component and decreases as the frequency component becomes high. As a result, even in case of the orthogonal components which have been orthogonally transformed, the low frequency components (the component on the upper right in FIG. 7) has a comparatively large value. Accordingly, the data amount reduction effect of the variable length encoding on the orthogonal component representing the low frequency becomes small. In the fourth variable length coding unit, the fixed length encoding is applied to the orthogonal component thus representing the low frequency and on the other hand, the variable length encoding is applied to the orthogonal component representing the medium/high frequency. This example is explained by referring to FIG. 17. In FIG. 17, element 82 is an input terminal; element 83 is a switch; element 84 is a fixed length encoding unit; element 85 is a variable length encoding unit; element 86 is a low frequency range detecting unit, and element 87 is an output terminal. the low frequency range detecting unit 86 determines if quantized value of the orthogonal components inputted from the input terminal 82 is a low frequency or a medium/high frequency. The low frequency range detecting unit 86 can be a counter for practical purposes. When the low frequency range detecting unit 86 detects the quantized value of a low frequency, the quantized value of the orthogonal components is inputted through the switch 83 to the fixed length encoding unit 84 for encoding in the fixed length form and outputted to the output terminal 87. On the other hand, the detecting unit 86 detects the quantized value to be of a medium or high frequency, the quantized value of the orthogonal components is inputted through the switch 83 to the variable length encoding unit 85 for encoding in the variable length form and outputted to the output terminal 87. With the structure as shown above, it becomes possible to encode only the low frequency portion in the fixed length form.

Figure 18:
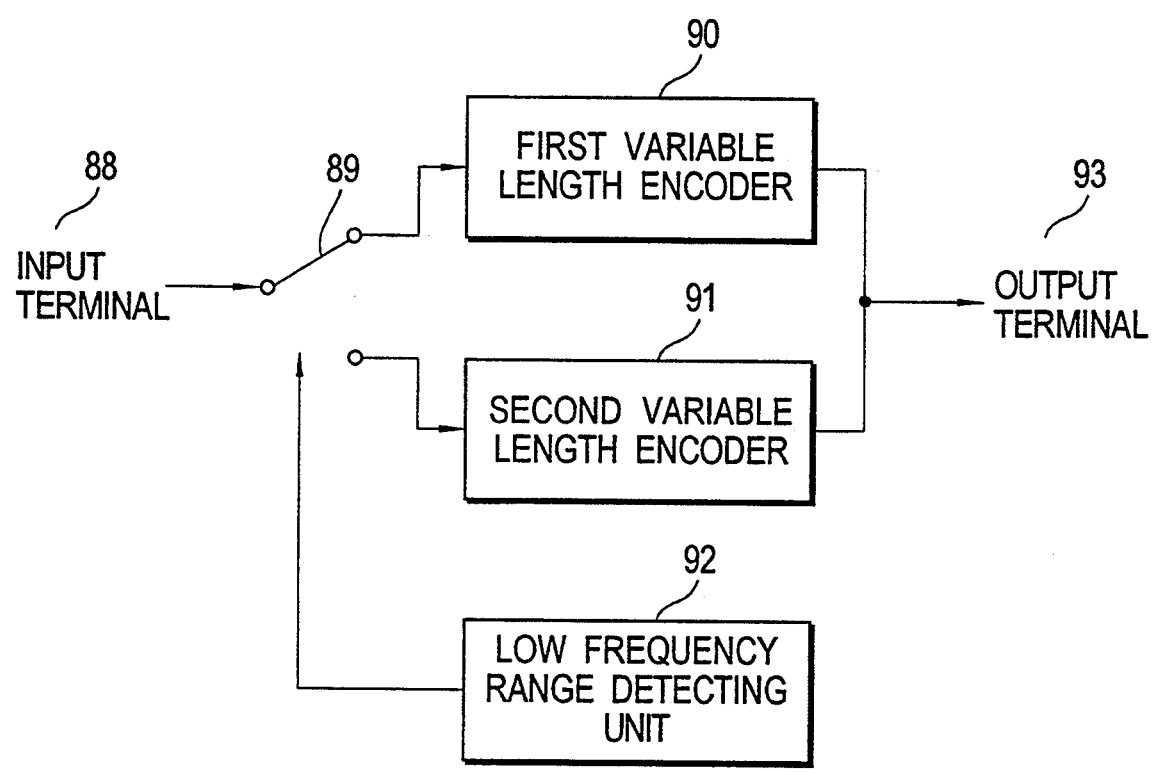

Next, a fifth example of the variable length encoding unit shown in FIG. 2 will be explained below. As explained in the fourth variable length coding unit, in this example, the orthogonally transformed component has different distributions in the low and high frequency ranges. As a result, for the low frequency range, the code length for small quantized values is set to be comparatively large and that for large quantized values is set to be comparatively small, and on the other hand, for the high frequency range, the code length for small quantized values is set to be comparatively small and that for large quantized values is set to be comparatively large, so that the data amount can be more efficiently reduced. The fifth variable length encoding unit will be explained by referring to FIG. 18. In FIG. 18, element 88 is an input terminal; element 89 is a switch; element 90 is a first variable length encoding unit; element 91 is a second variable length encoding unit; element 92 is a low frequency range detecting unit, and 93 is an output terminal. The low frequency range detecting unit 92 determines if quantized value of the orthogonal components inputted from the input terminal 88 is of low frequency range or the high frequency range. The low frequency range detecting unit 92 can be a counter for practical purposes. When detected to be of the low frequency range, the quantized value of the orthogonal components is sent through the switch 89 to the first variable length encoding unit 90 for encoding in the variable length form and outputted to the output terminal 93. On the other hand, when detected to be of the high frequency range, the quantized value of the orthogonal components is sent through the switch to the second variable length encoding unit 91 for encoding in the variable length form and outputted to the output terminal 93. With the structure as above, the variable length encoding can be applied to the low frequency range and high frequency range. Also, in this example, the quantized value is divided into two ranges, the low and high frequency ranges, but it can be divided into more ranges, and the variable length encoding can be applied to each range thus divided.

Figure 19:
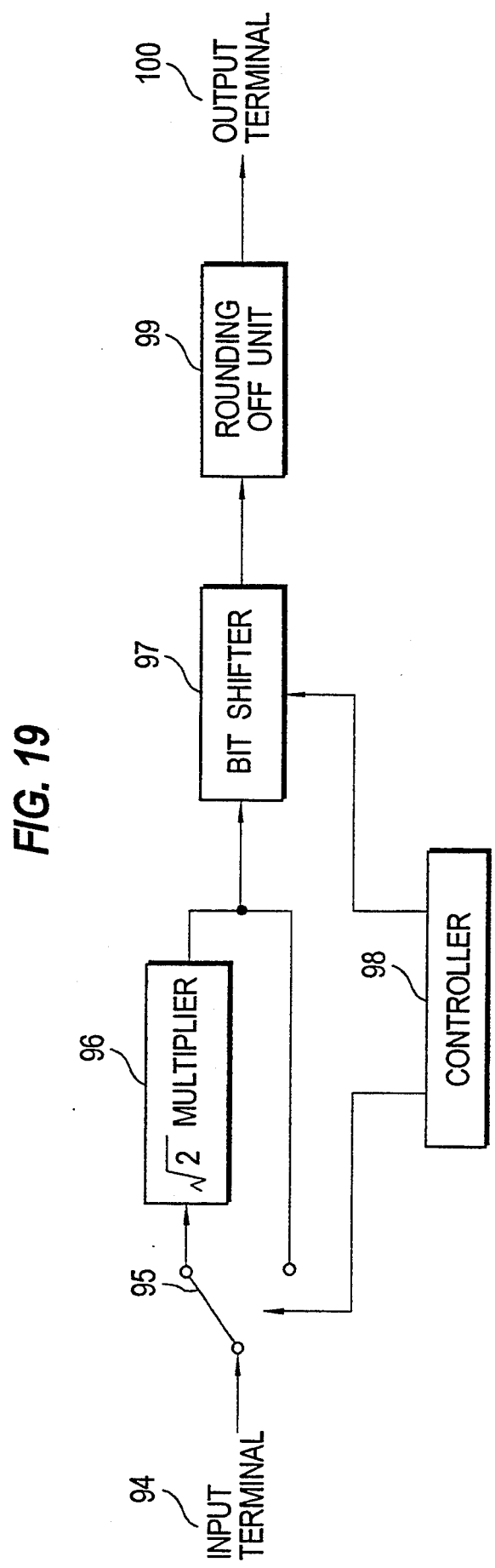
FIGS. 19 to 22 are block diagrams and an explanatory drawing showing examples of the quantizing unit used in the apparatus of this invention.

Next, the quantizing unit of this invention will be explained below. FIG. 19 is a first example of the quantizing unit shown in FIG. 2. In FIG. 19, element 94 is an output terminal; element 95 is a switch; element 96 is a $\sqrt{2}$ multiplier; element 97 is a bit shifter; element 98 is a controller; element 99 is a rounding unit, and element 100 is an output terminal. The signal inputted from the input terminal 94 is selected by the switch 95 according to the control of the controller 98 to either be subjected to a $\sqrt{2}$ multiplication in the $\sqrt{2}$ multiplier 96 and sent to the bit shifter 97 or directly sent to the bit shifter 97. In the bit shifter 97, the thus sent signal is shifted by a specific number of bits according to the control of the controller 98, and then rounded off in the rounding off unit 99 and sent to the output terminal 100. With the arrangement in this example shown in FIG. 19, the multiplication (or the division) of various constants can be realized through the controller 98 by combining the $\sqrt{2}$ multiplier 96 and the bit shifter 97. As a result, a quantizing unit having a plurality of the quantization widths (multiplier factors) can be easily realized. In addition, in FIG. 19, an arrangement without using the switch 95 and $\sqrt{2}$ multiplier 96 is possibly realizable. In such case, since the quantizing unit is a bit shifter only, it can be easily realized.

Figure 20:
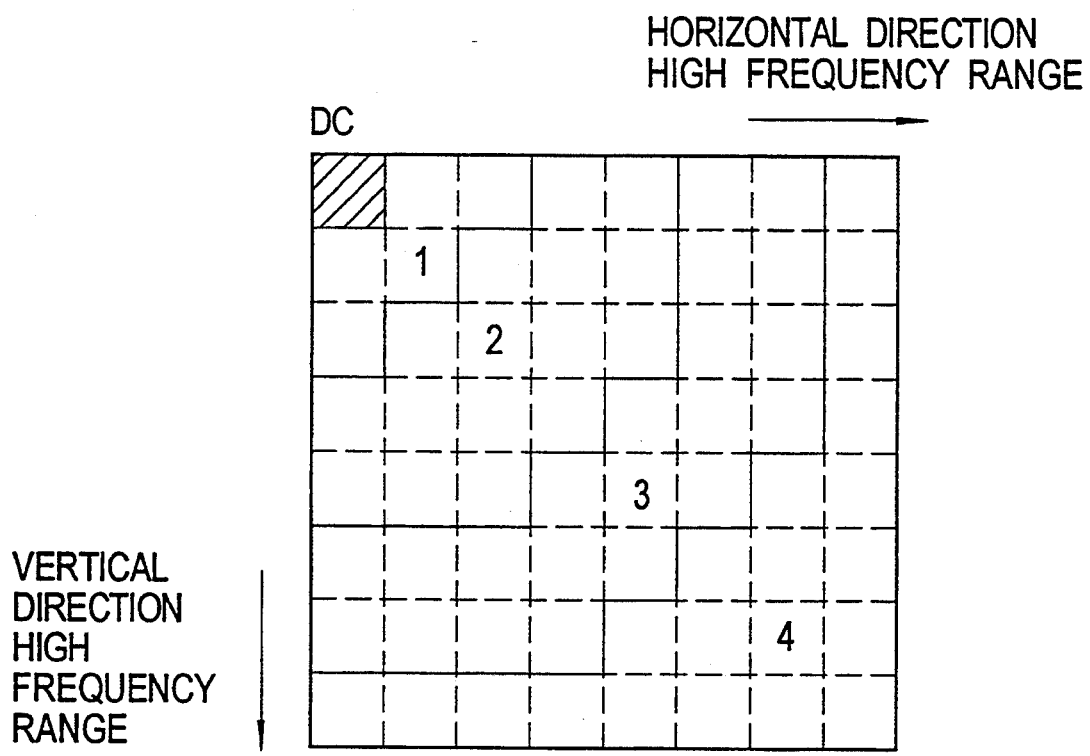

A second example of the quantizing unit shown in FIG. 2 will be explained below. FIG. 20 shows that the orthogonal components of (8×8) DCT blocks explained in FIG. 7 are divided into four ranges excepting DC components (shaded area in FIG. 20). The numerals shown in FIG. 20 indicate the numbers of respective ranges. Generally, human vision is sensitive to the distortion of low frequency components and sensitive to the distortion of low frequency components and insensitive to that of high frequency components. As a result, by quantizing the high frequency component with larger quantization width, the compression of the amount of data can be improved while making visual deterioration small. In the second quantizing unit, the quantization width is controlled by range shown in FIG. 20. Table 3 shows the relationship of the range of quantization. With the quantization shown in FIG. 3, 16 kinds of quantizing means are available (columnar direction of Table 3), and each quantizing means has four frequency ranges as shown in FIG. 20 (row direction of Table 3). The fractions shown in Table 3 each indicates the multiplier factor of multiplication (the inverse number of quantization range) to be executed the quantization for a quantizing means (column) and range (row). For example, in the fifth quantizing means, the multiplication of ¼ is executed for the orthogonal component in the second range (quantized with the quantization width of 4). As seen from Table 3, the multiplier factor to be actually employed in this example has five kinds ranging from 1/16 to 1. As a result, the combination of five kinds of quantization width and four kinds of ranges makes 16 kinds of quantizing means realizable. By introducing such quantizing means into this example, a large number of quantizing means can be realized despite using simple quantization by using a bit shifter, so that the amount of data can be more precisely controlled. In addition, by making the quantization width larger for the high frequency range, the visual picture deterioration can be reduced.

Referring to the data amount estimation for the quantizing means shown in Table 3, the data amounts for the five kinds of quantization width area calculated independently for every four kinds of ranges, and then the results thus calculated can be combined to calculate the data amounts for the 16 kinds of quantizing means. Therefore, the circuit scale of the amount of data estimating unit can be made small.

TABLE 3

| Range | Quantization | | | |
|---|---|---|---|---|
| | 1 | 2 | 3 | 4 |
| 0 | 1/8 | 1/16 | 1/16 | 1/16 |
| 1 | 1/8 | 1/8 | 1/16 | 1/16 |
| 2 | 1/8 | 1/8 | 1/8 | 1/16 |
| 3 | 1/8 | 1/8 | 1/8 | 1/8 |
| 4 | 1/4 | 1/8 | 1/8 | 1/8 |
| 5 | 1/4 | 1/4 | 1/8 | 1/8 |
| 6 | 1/4 | 1/4 | 1/4 | 1/8 |
| 7 | 1/4 | 1/4 | 1/4 | 1/4 |
| 8 | 1/2 | 1/4 | 1/4 | 1/4 |
| 9 | 1/2 | 1/2 | 1/4 | 1/4 |
| 10 | 1/2 | 1/2 | 1/2 | 1/4 |
| 11 | 1/2 | 1/2 | 1/2 | 1/2 |
| 12 | 1 | 1/2 | 1/2 | 1/2 |
| 13 | 1 | 1 | 1/2 | 1/2 |
| 14 | 1 | 1 | 1 | 1/2 |
| 15 | 1 | 1 | 1 | 1 |

Figure 21:
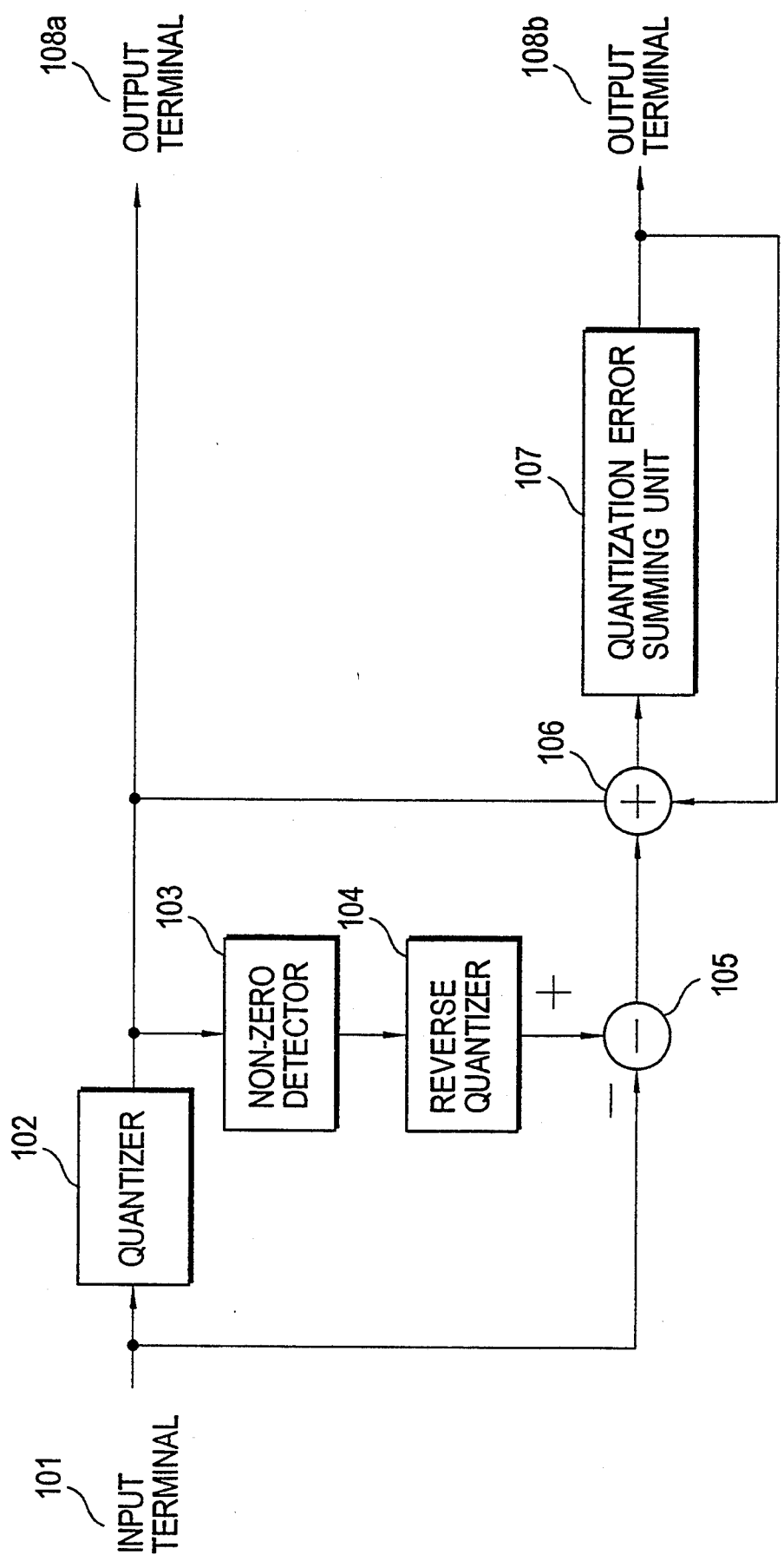

FIG. 21 shows a third example of the quantizing unit shown in FIG. 2. In FIG. 21, element 101 is an input terminal; element is a quantizer; element 103 is a non-zero detecting unit; element 104 is a reverse quantizer; element 105 is a subtracter; element 106 is an adder; element 107 is a quantization error summing unit, and element 108a and 108b are output terminals. The signals inputted from the input terminal 101 are quantized in the quantizer 102 and sent to the output terminal 108a. On the other hand, the outputs from the quantizer 102 are sent to the non-zero detecting unit 103 to detect whether or not the output is 0. If it is not 0, the non-zero output is sent to the reverse quantizer 104 to be subjected to reverse quantization. The output this reversely quantized outputted from the reverse quantizer 104 is sent to the subtracter 105 to calculate the quantization error between the thus reversed quantized value and the value of the input signal. The thus calculated quantization error is added in the adder 106 to the total value of the previous quantization errors of the quantized values outputted from the quantization error sun, ming unit 107 and sent again to the quantization error summing unit 107. In such a manner as shown above, the total quantization errors of one small block are summed and outputted to the output terminal 108b. In this example of the quantization, an average value of the quantization errors of non-zero quantized values for every small block is calculated and outputted with the quantized value. The quantization errors in the orthogonal transformation are often uneven on a small block basis. Therefore, the quantization errors are calculated for every small block and the correction is made using the data of the thus calculated quantization errors at the time of the decoding, thereby reducing the quantization distortion. The signals representing the quantization error for one small block to be transmitted at this time can be represented by a few bits; thus, the increment of the amount of data is very small.

Figure 22:
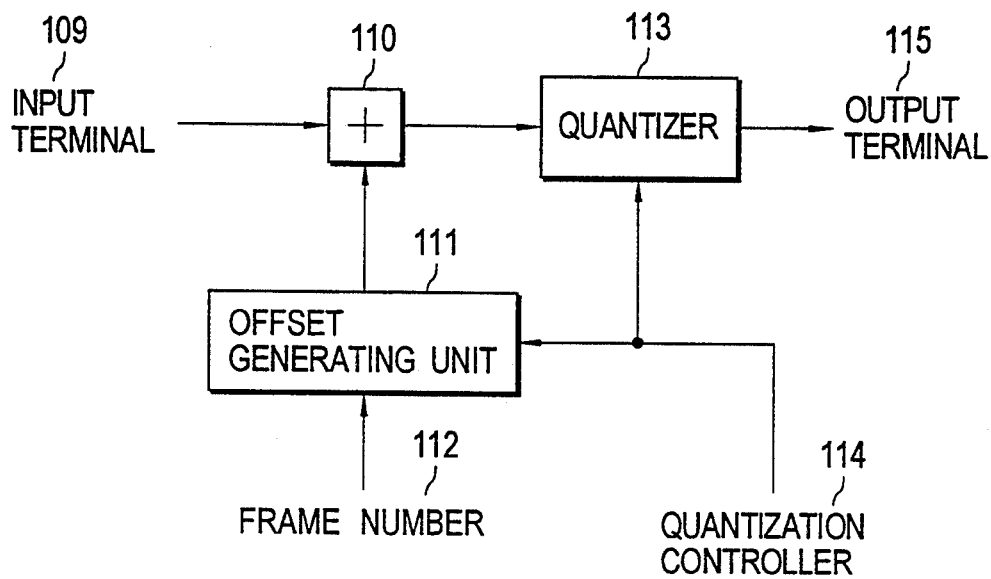

In a fourth example of the quantizing unit shown in FIG. 2, signals situated on the same positions in the frame direction or the field direction are quantized by separate quantizers of different quantizing properties for every frame or every field. The fourth quantizing unit will be explained below using FIG. 22. In FIG. 22, element 109 is an output terminal; element 110 is an adder; element 111 is an offset generating unit; element 112 is a frame number input unit; element 113 is a quantizer; element 114 is a quantization controller and element 115 is an output terminal. The orthogonal components inputted from the input terminal 109 are added to the offset value outputted from the offset generating unit 111 in the adder 110 and quantized in the quantizer 113 in accordance with the information obtained from the quantization controller 114 and sent to the output terminal 115. On the other hand, in the offset generating unit 111, the offset value is generated in accordance with the present frame number inputted from the frame number input unit 112 and the information inputted from the quantization controller 114. For example, when the quantization is made with a large quantization width in accordance with the information from the quantization controller 114, the offset value is made large, and different offset values are outputted when the frame number is odd and even. By using the fourth quantizing unit, it becomes possible to provide the quantization error with a variation for every frame. As a result, in the still picture, it becomes possible to cancel the quantization error on a frame to frame basis.

In addition, due to the fact that the quantization error differs on a frame to frame basis, the distortion can be scattered time to time, so that the block distortion can be decreased. In this example, the rounding off operation is controlled by means of the offset value to provide the quantization property with a variation; however, it can be realized by varying the quantization property itself of the quantizer in a frame to frame manner.

Figure 23:
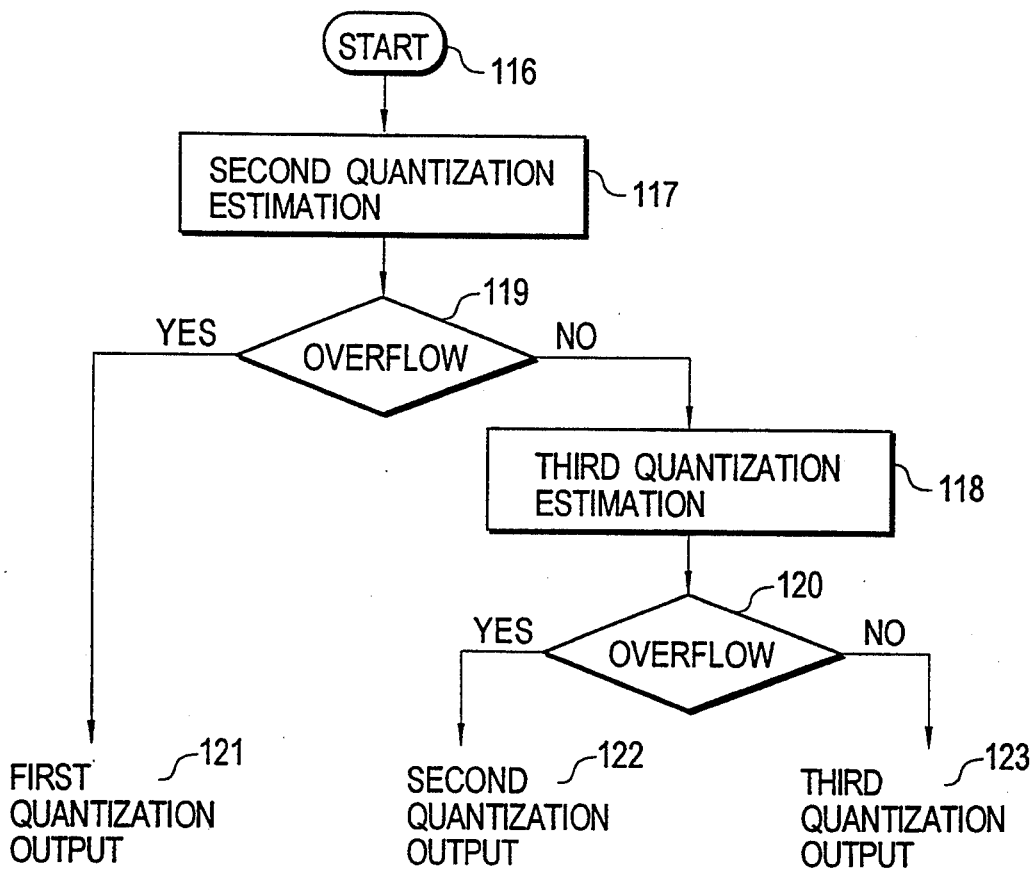
FIGS. 23 to 28 are block diagrams and flowcharts showing examples of the quantizer selecting unit used in the apparatus of this invention.

Next, the quantizer selecting unit shown in FIG. 2 will be explained. A first example of the quantizer selecting unit operates in such a manner as described below. Namely, when there are n quantizer candidates, the amount of data after encoding is estimated for the quantizer producing about n/2th the amount of data of the quantized value. When the estimated quantized amount of data is larger than a transmittable value, the quantizer candidates are limited to such a quantizer that produces the amount of data smaller than the amount of data produced by the selected quantizer for performing the amount of data estimation. On the other hand, when the estimated amount of data is smaller than the transmittable value, the candidate quantizer are limited to such a quantizer that produces the amount of data larger than the amount of data by the selected quantizer for performing the amount of data estimation. By this way, the number of quantizer candidates is approximately halved by one amount of the data estimation and the above-mentioned operation is repeated; thus, the optimum quantizers can be selected. By this method, it is possible to select the optimum quantizers by performing about $\log^2 n$ times of amount of data estimation when there are n quantizer candidates. An example of the process described above is shown in flowchart form in FIG. 23. In FIG. 23, element 116 is a start step; element 117 is a second quantization estimation; element 118 is a third quantization estimation; element 119 and 120 are each overflow detections; element 121 is a first quantization output; element 122 is a second quantization output and element 123 is a third quantization output. In this example, three quantizing units are provided, and larger quantized values are generated in the order of the third quantization, second quantization and first quantization for the same input value. First, the second quantization estimation is made in step 117 using the second quantization for the input signal. Then, the process goes to step 119 for detecting whether or not the amount of data for the second quantization obtained in the second quantization step 117 exceeds the transmittable limit. In this case, if it exceeds the limit, then the first quantization is selected. On the other hand, if it does not exceed the limit, then the process goes to step 118 for estimating the amount of data using the third quantization. Then, the process goes to step 120 for detecting whether or not the amount of data quantized in the third quantization exceeds the transmittable limit. In this case, if the limit is exceeded, the second quantization is selected. On the other hand, if the limit is not exceeded, then the process goes to step 123 for performing the third quantization. As explained above, in the second example of the quantizer selecting unit, it becomes possible to greatly decrease the amount of calculation for the amount of data estimation. Also, in this example, a quantizer that produces the maximum amount of data not exceeding the transmittable limit is selected; however, a quantizer may be selected that produces the minimum amount of data not less than the transmittable limit.

In a second example of the quantizer selecting unit, the small blocks contained in one large block are divided into two of the half front and rear front with the boundary of the jth small block counted from the front top one. For these two groups thus divided, two quantizers having the nearest amount of data after encoding are selected. In transmitting, the information of the values of the order numbers i and j of the selected quantizer to be used in the half front or the rear front are encoded and transmitted. In the second example, only two kinds of quantizing units are used in one large block. By this limitation, since the number of the combination of quantizers in the large block can be greatly decreased, there is a decrease in the amount of calculation. In addition, the two kinds of quantizing units are selected from the groups of the small blocks consisting of the front half and rear half divided in the large block. As a result, the information representing what quantizer is to be used may be expressed only by the boundary of the front half and rear half (namely, the jth small block) in the large block, so that the information amount to be transmitted can be made small.

Here, a concrete example will be shown. It is assumed that there are 16 kinds of quantizers and one large block consists of 30 small blocks. Also, it is assumed that the amount of data of the jth small block in the ith quantizer is expressed as D(i,j) and the following S(i,j) is defined as:

$$S(i,j) = D(i,j) - D(i-1,j)$$

(where it is assumed that $D(-1,j) = 0$ and $D(i,j) \geq D(I,-1,j)$)

Using the above equation, calculation is made for 30 small blocks to obtain Table 4 and stored in a memory.

TABLE 4

| | Amount of Data | | | | | |
|---|---|---|---|---|---|---|
| | 0 | 1 | 2 | ... | j | ... | 29 |
| 0 | S (0,0) | S (0,1) | S (0,2) | ... S | (0,j) | ... S | (0,29) |
| 1 | S (1,0) | S (1,1) | S (1,2) | ... S | (i,j) | ... S | (1,29) |
| . | . | . | . | | . | | . |
| i | S (i,0) | S (i,1) | S (i,2) | ... S | (i,j) | ... S | (i,29) |
| . | . | . | . | | . | | . |
| 15 | S (15,0) | S (15,1) | S (15,2) | ... S | (15,j) | ... S | (15,29) |

Figure 24:
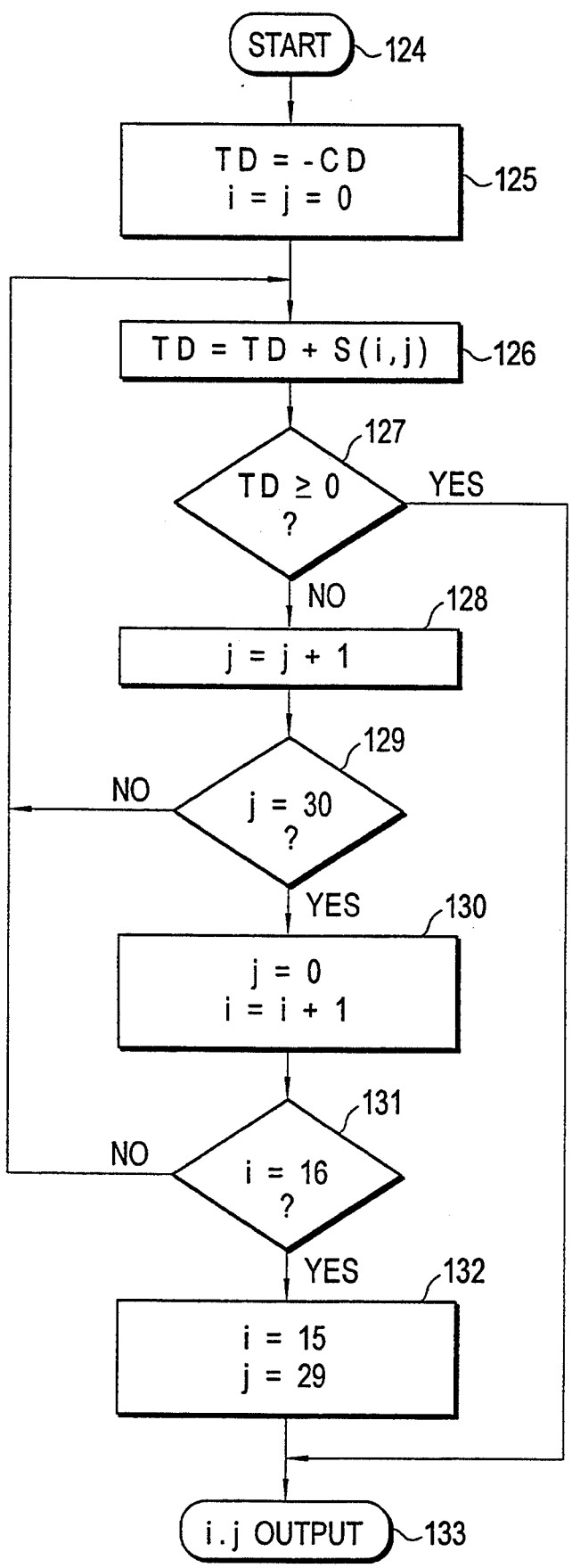

The optimum values i and j are calculated according to the flowchart shown in FIG. 24 using the amount of data shown in Table 4. In FIG. 24, element 124 is a start step; element 125 is an initial value setting; element 126 is a total amount of data calculation; element 127 is an overflow detection; element 128 is an increment; element 129 is a j detection; element 130 is an i increment; element 131 is an i detection; element 132 is an overflow processing, and element 133 is an output terminal.

First, in step 125, the initial value is set as the total amount of data TD=−CD (CD is the target amount of data after compression) and i=j=0. In step 126, the total amount of data is calculated by the equation AD=TD+S(i,j). In step 127, whether nor not the value of TD is larger than 0 is detected; when the value is more than 0, the process goes to step 133 to output the value i and j and the process ends. When the value of AD is negative, the process goes to step 128 to calculate j=j+1. The process goes to step 129 to detect whether or not the value of j is 30; when the value is equal to 30, the process goes to step 126. When the value is equal to 30, the process goes to step 130 to calculate i=i+1 and j=0. In the i detection step 131, whether or not the value of i is 16 is detected when the value is not 16, the process goes to step 126. On the other hand, when the value is 16, the process goes to step 132 for making i=15 and j=29, and the values i and j are outputted in step 133 and the process ends. By this way, the values i and j can be calculated. Since the values i and j can be expressed by 4 bits and 5 bits, respectively, the information as to what quantizer is selected can be transmitted by 9 bits for each large block.

A second example of the second quantizer selecting unit will be explained below. In this example, one large block consists of 30 small blocks and there exist 16 kinds of quantizers candidates. In addition, assuming that the amount of data of the jth small block in the ith quantizer is expressed by D(i,j), similar to in the first example, the following S(i,j) is defined as:

$$S(i,j) = D(i,j) - D(i-1,j)$$

$$AD(i) = \sum_{i=0}^{29} D(i,j).$$

Figure 25:
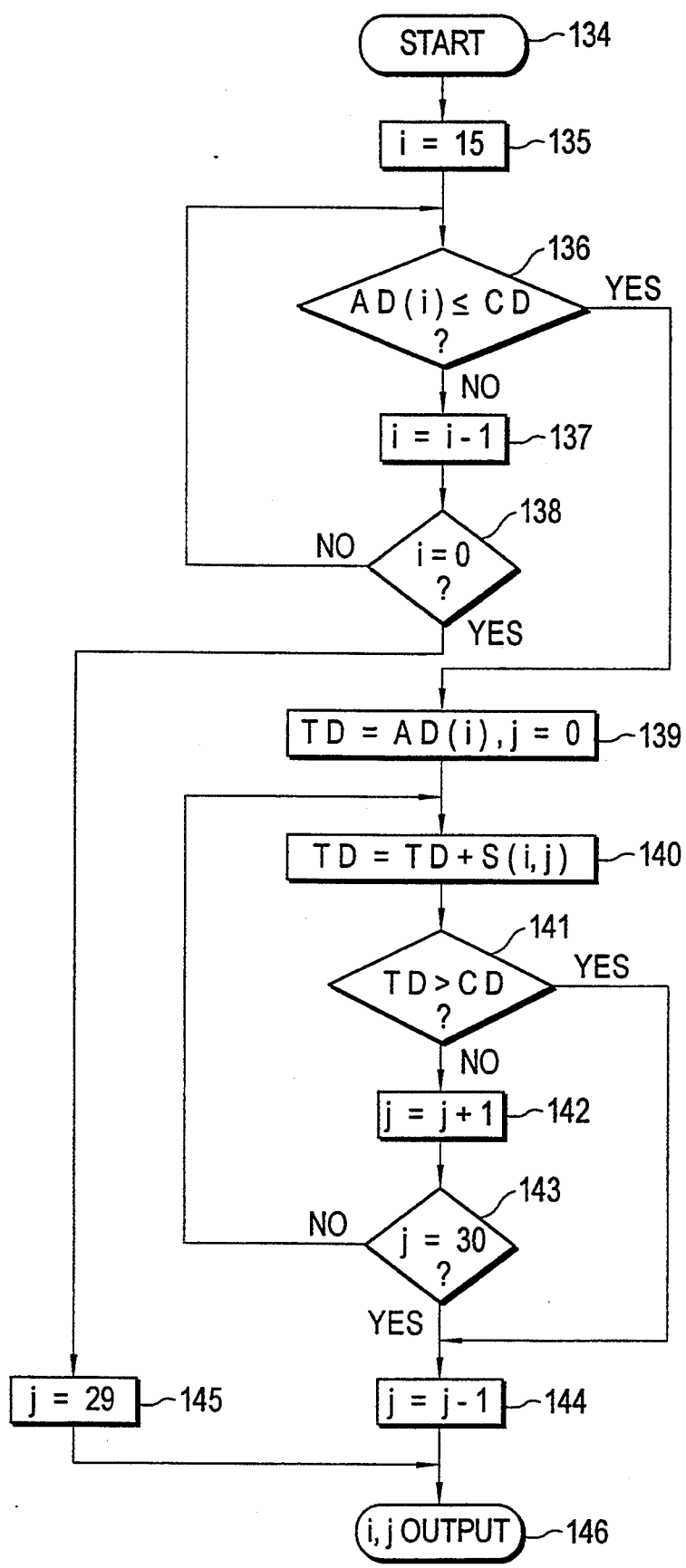

With the equation shown above, calculations are made for obtaining Table 5 and stored in a memory in the same manner as in obtaining Table 4. In this example, using the amount of data tabulatedly as shown in Table 5 and according to the flowchart shown in FIG. 25, the optimum values of i and j are determined. In FIG. 25, element 134 is a start step; element 135 is an initial i value setting; element 136 is a first amount of data comparison; element 137 is an i decrement; element 138 is an overflow detection; element 139 is a TD/initial j value setting; element 140 is a TD increment; element 141 is a second amount of data comparison; element 142 is a j increment; element 143 is a j overflow detection; element 144 is a j decrement; element 145 is a j setting, and element 146 is an output terminal.

TABLE 5

| | Amount of Data | | | | |
|---|---|---|---|---|---|
| | 0 | 1 | ... | j | ... | 29 | |
| 0 | — | — | | — | | — | AD (0) |
| 1 | S (1,0) | S (1,1) | ... | S (1,j) | ... | S (1,29) | AD (1) |
| . | . | . | | . | | . | . |
| i | S (i,0) | S (i,1) | ... | S (i,j) | ... | S (i,29) | AD (i) |
| . | . | . | | . | | . | . |
| 15 | S (15,0) | S (15,1) | ... | S (15,j) | ... | S (15,29) | AD (15) |

Next, the operation of the flowchart shown in FIG. 25 will be explained. First, in the initial i value setting step 135, the initial value i is set to 15. In step 136, AD(i) and CD (the amount of data actually transmittable) are compared and if AD(i)≦CD, the process goes to step 139, and if AD(i)>CD, the process goes to step 137 to calculate i=i−1, and goes to step 138.

In step 138, whether or not the value of i is 0 is determined, and if i=0, the process goes to step 145 to set the value i to 29, and the values i and j are outputted to step 146. On the other hand, if i≠0, the process goes to step 136 In step 139, TD−AD (i) and j=0 are set. Then, in step 140, TD−TD+S (i, j) is calculated and the process goes to step 141. In step 141, TD and CD are compared, and if TD>CD, the process goes to step 141, and if TD≦CD, the process goes to step 142 to calculate j=j+1 and goes to step 143.

In step 143, whether or not the value j is 30 is determine, and if j=30 the process goes to step 144, and if j≠30 the process goes to step 140.

In step 144, j=j−1 is calculated and the values i and j are outputted to the output step 146.

Thus, the values i and j can be obtained. Also, in this example, since the values i and j can be expressed by 4 bits and 5 bits, respectively, the information on what quantizer is selected can be transmitted by 9 bits for every large block. In addition, in this example, the value i is determined first and then, the value j is determined, so that the amount of calculation can be decreased and the calculation time can be shortened.

Figure 26:
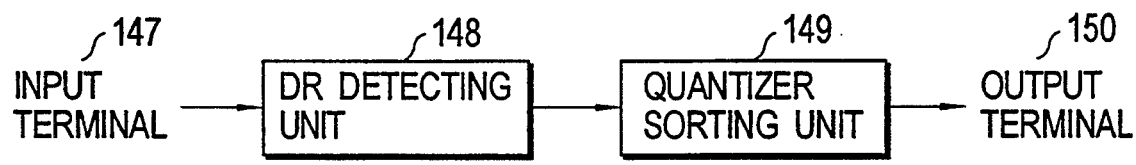
Figure 27:
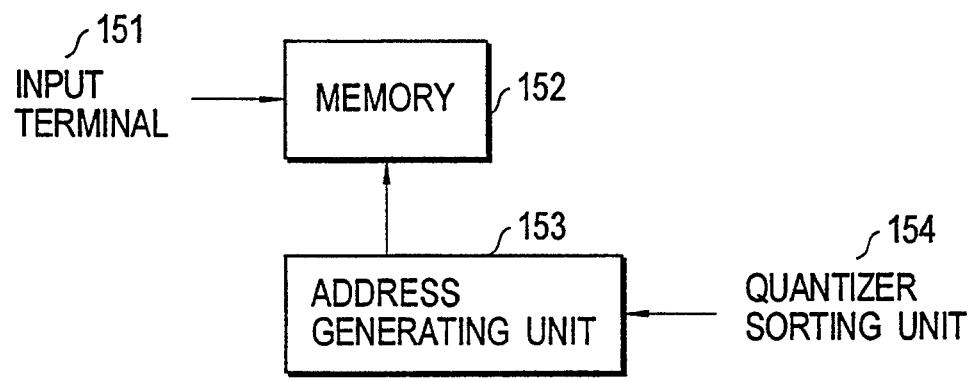

A third example of the quantizer selecting unit detects a dynamic range for each small block, and for the small block detected to have a large dynamic range, a quantizer having a large quantization width is selected, and for the small block detected to have a small dynamic range, a quantizer having a small quantization width is selected. In the transmission, the information on what quantizer is selected is encoded for each small block and transmitted. FIG. 26 shows an example of the third quantizer selecting unit. In FIG. 26, element 147 is an input terming; element 148 is a dynamic range detecting unit; element 149 is a quantizer sorting unit, and element 150 an output terminal. the data for each small block inputted forma the input terminal 147 is sent to the dynamic range detecting unit 148 to detect the dynamic range thereof. As a method of performing such detection, there exists such a technique that the detection is made by the value of the orthogonal component whose absolute value is maximum in the small block. The quantizer sorting unit 147 sorts the quantizers for such small block in response to the dynamic range thus detected and the thus obtained result is outputted to the output terminal 150. For example, if the small block is sorted into four kinds according to the size of the dynamic range, the output from the quantizer sorting unit 149 can be expressed by 2 bits. Also, as an actual method of selecting the quantizer, the quantization width of the small block is made large as the dynamic range thereof becomes large. As a result, if the quantizer as shown in Table 3 is used, the small block having larger dynamic range is assigned a quantizer having a small number. Also, as a method of making the data amount constant, the second quantizer selecting unit is possible applied. In this case, if Table 4 or 5 is to be prepared, it can be realized by shifting the position where the data is to be written for each small block in the columnar direction in advance. That is, in preparing Table 4, a small block having large dynamic range shifts the corresponding now thereto downward to be written, and on the other hand, a small block having small dynamic range shifts the corresponding row thereto upward to be written. By this way, by detecting Table 4 in the columnar direction, in the small block having large dynamic range, the amount of data of a quantizer having large quantization width is written and on the other hand, the small block having small dynamic range has the amount of data of a quantizer having small quantization width written. As a result, by applying such an algorithm as shown in FIG. 24 or 25 in accordance with the table prepared as above, the combination of the quantizers becomes possible to make the amount of data constant. This method will be explained by referring to FIG. 27. In FIG. 27, element 151 is an input terminal; element 152 is a memory, element 153 is an address generating unit, and element 154 is a quantizer sorting unit. The amount of data on a small block unit basis inputted from the input terminal 151 is stored in the memory 152 in accordance with the address generated by the address generating unit 153. The address generating unit 153 controls the address for every small block in accordance with the signal inputted from the quantizer sorting unit 154. This example describes on the method of controlling the input address of the memory, but the same effect can be obtained by controlling the output address of the memory. In general, in case of a picture having large dynamic range, the visual picture deterioration thereof can be difficult to detect and in case of a picture having small dynamic range, it can be easily detected. As a result, by assigning a quantizer having large quantization width to such a small block that the maximum value of the absolute value of the quantized value (dynamic range) is large, the data amount can be largely compressed while suppressing the visual picture deterioration.

Figure 28:
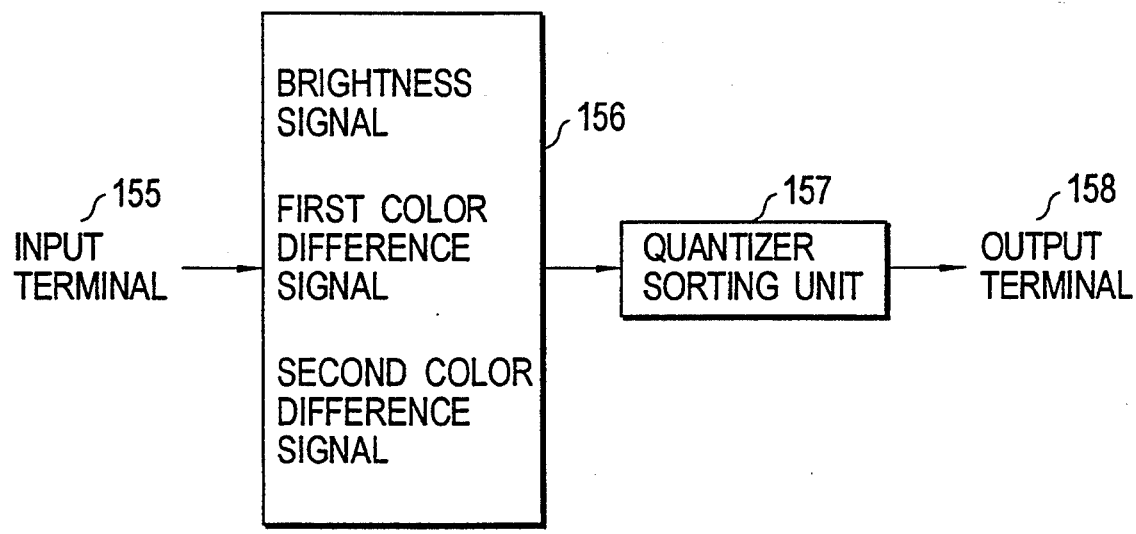
Figure 29:
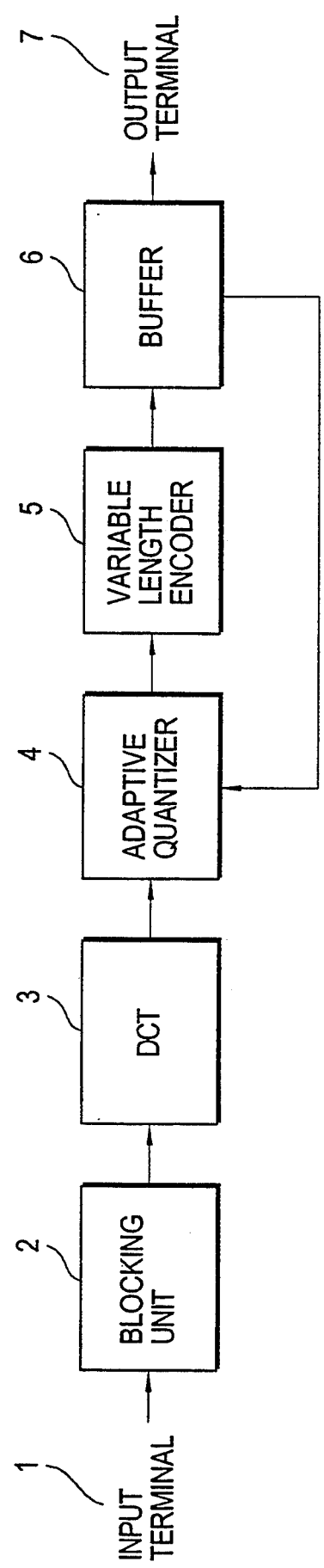
FIG. 29 is a block diagram of a conventional orthogonal transform coding apparatus of the prior art.

A fourth example of the quantizer selecting unit will be shown below. In the fourth example, the quantizer selecting unit is designed adapted to select a quantizer having large quantization width for the signals which are difficult to detect the visual picture deterioration and a quantizer having small quantization width for the signals which are easy to detect the visual picture deterioration for the brightness signal and two color difference signals. This will be explained below by referring to FIG. 28. In FIG. 28, element 155 is a number input terminal for every small block; element 156 is a brightness signal, first color difference signal and a second color difference signal judging unit; element 157 is a quantizer sorting unit and element 158 is an output terminal. In response to the number of a small block (processing order) inputted from the input terminal, the unit 156 judges whether the small block thus inputted is of the brightness, first color difference or second color difference signal. In the quantizer selecting unit 157, in accordance with the result of judgement shown above, the quantizer corresponding to the small block is sorted and the result thus sorted is outputted to the output terminal 158. Also, in the actual selection of the quantizer, it can be realized by controlling the address to the memory and applying the quantizer selecting unit shown in the second example as shown in FIG. 27.

As explained above, the quantizer selecting unit as designed as above of this invention makes it possible to make the circuit scale small in calculating the amount of data by decreasing the number of operations. In this case, some errors may be generated between the estimated amount of data and the actually transmittable amount of data; however, the possibility of varying the quantized values to be selected due to the thus generated errors is very small. As a result, almost no deterioration in picture quality results and a reduction in circuit scale becomes possible.

Finally, the process order of the components including the large blocking, small blocking and orthogonal transform units may be changed variously other than the orders shown in the above-mentioned examples.

With the arrangement as described above, this invention makes it possible for the coded amount of data to be read in advance, thereby always quantizing it using an optimum quantizer. Also, different from the conventional feed-back control technology, the amount of data can be precisely controlled, so that such a variable length encoding can be provided such that the code length becomes constant in a small range. Accordingly, even in case of equipment in which transmission line errors may often occur as in, for example, a digital VCR, it is possible to use the variable length encoding. In addition, the use of the quantizer, amount of data estimating unit or the like according to this invention makes it possible to make the equipment on a comparatively small circuit scale, which means that the practical effects of this invention are extremely large.

I claim:

1. An orthogonal transform coding apparatus comprising:

a large blocking means for assembling sample values of an input sample to form a large block of sampled values;

a small blocking means for dividing said large block of sampled values into a plurality of small blocks;

an orthogonal transform means for orthogonally transforming the sample values in each of the small blocks to obtain orthogonally transformed components;

a plurality of kinds of quantizers each for quantizing the orthogonally transformed components to obtain quantized data;

an amount of data estimating means for estimating an amount of coded data which would be obtained by variable length encoding the quantized data quantized by each of the plurality of kinds of quantizers in each of the plurality of small blocks to obtain a plurality of amount of data values corresponding to the plurality of quantizers with respect to the plurality of small blocks, said amount of data estimating means including an amount of data storing means for storing the plurality of amount of data values a quantizer selecting means for selecting, among the plurality of kinds of quantizers, a quantizer which gives an optimum amount of coded data with respect to each of the plurality of small blocks according to the amount of data values stored in the amount of data storing means such that a total amount of coded data in the large block becomes either a maximum amount of data within a range not larger than an actually transmittable amount of data or a minimum amount of data within a range not smaller than the actually transmittable amount of data, and for outputting a selection signal indicative of the selected quantizer;

a variable length encoding means for encoding a quantized data quantized by the quantizer selected by said quantizer selecting means to obtain actual coded data; and a transmission means for transmitting the actual coded data and the selection signal.

2. An orthogonal transform coding apparatus as claimed in claim 1, wherein when there are n quantizer candidates and m small blocks in one large block, and the amount of data in the jth small block of the ith quantizer is expressed as $D(i,j)$, if $D(i,j) \geq D(i-1,j)$ when $1 \leq i < n$, said amount of data storing means first stores $D(o,j)$ for said m small blocks in a memory, and then, if $S(i,j) = D(i,j) - D(i-1,j)$ when $1 \leq i < n$, said amount of data recording means successively stores $S(i,j)$ in said memory with regard to i, and said quantizer selecting means reads and successively adds $D(o,j)$ in said m small blocks from 0 to m−1 with regard to j, and then, to the result thus added are successively added $S(i,j)$ in the order of $S(0,0), S(0,1) \ldots, S(0,m-1), S(1,0) \ldots$, and $S(n-1,m-1)$, i and j with respect to the equation $S(i,j)$ when the added result exceeds the transmittable amount of data, and an ith quantizer is selected for the small blocks from a 0th up to a (j−1)th or jth small block, and an (i−1)th quantizer is selected for the small blocks coming thereafter.

3. An orthogonal transform coding apparatus as claimed in claim 1, wherein when there are n kinds of quantizers and m small blocks included in one large block, and the amount of data in the jth small block of the ith quantizer is expressed as $D(i,j)$, if $D(i,j) \geq D(i-1j)$ when $(1 \geq i < n)$, said amount of data recording means successively stores $S(i,j) = D(i,j) - D(i-1,j)$ for said m small blocks in a memory with regard to i, and simultaneously stores a sum $AD(i)$ which is a total amount of data of said m small blocks corresponding to each quantizer with regard to i, and the quantizer selecting means first compares said sum $AD(i)$ with the transmittable amount of data with regard to i being $(1 \leq i < n)$, and the maximum sum $AD(K)$ not exceeding the transmittable amount of data and K are fetched, and then, to said maximum sum $AD(K)$ are added $S(k+1,j)$ in the order of $j = 0, 1, \ldots, m-1$ in a successive manner, j with respect to an equation $S(k+1,j)$ when the added result exceeds the transmittable amount of data, and a (k+1)th quantizer is selected or the small blocks from a 0th to a (j−1)th or jth small block, and a kth quantizer is selected for the small blocks coming thereafter.

4. An orthogonal transform coding apparatus as claimed in claim 1, wherein when writing a difference of quantizer for the small blocks different in a dynamic range from each other or for a luminance signal and two color difference signals and the amount of data for each small block in a memory, said quantizer selecting means controls a writing address or reading address of the memory for every small block according to the difference of the quantizer thus written.

5. An orthogonal transform coding apparatus as claimed in claim 1, wherein said variable length encoding means encodes a quantized value with a code length 1 for a quantized value 0 and the amount of data estimating means calculates an amount of the coded quantized values in the small blocks of one quantizer according to the equation:

$$\Sigma(Ni-1)+M$$

where, Ni is a code length of the ith quantized value, and M is the number of the quantized values to be transmitted.

6. An orthogonal transform coding apparatus as claimed in claim 5, wherein said variable length encoding means encodes a quantized value with a code length $2K+1$ or $2K$ for a quantized value whose absolute value is K, and said amount of data estimating means calculates an amount of data of the coded quantized values in the small blocks of one quantizer according to the equation $$2 \times \Sigma K_i + M$$

where, Ki is the absolute value of the ith quantizer, and M is the number of the quantized values to be transmitted.

7. An apparatus according to claim 1, wherein said quantizer selecting means first finds, among n kinds of quantizers, a quantizer which gives a n/2-th largest amount of coded data, where n is the number of quantizers to be searched to find an optimum quantizer among the plurality of kinds of quantizers, and then determines that quantizer candidates to be searched next are only quantizers which give amounts of coded data each being smaller than the n/2-th largest amount of data if the n/2-th amount of data is larger than a transmittable amount of data or only quantizers which give amounts of coded data each being larger than the n/2-th largest amount of data if the n/2-th amount of data is smaller than the transmittable amount of data, said quantizer selecting means repeating these operations until an optimum quantizer to be selected is found.

8. An orthogonal transform coding apparatus as claimed in claim 7, wherein said amount of data estimating means roughly estimates the amount of data which is smaller than that needed to actually calculate the amount of data.

9. An orthogonal transform coding apparatus as claimed in claims 1 or 7, wherein said quantizer selecting means includes means for dividing the small blocks included in a large block into a front half including quantizers from a top one to a jth one and a rear half of the remainder, and means for selecting one quantizer from each of the front half and rear half so as to produce nearest quantized values to each other, and means for coding and transmitting information of the quantizers thus selected in the front and rear halves and of the number j.

10. An orthogonal transform coding apparatus as claimed in claims 1 or 7, wherein for a luminance signal and two color difference signals, said quantizer selecting means selects a quantizer with a large quantization width for signals in which it is difficult to recognize visual picture degradation and a quantizer with a small quantization width for signals in which it is easy to recognize visual picture degradation.

11. An orthogonal transform coding apparatus as claimed in claim 1 or 7, wherein said transmission means rearranges the quantized values of a small block in a transmission region made by a smallest square, defined as a transmission region, in the order from a low frequency value to a high frequency value in both horizontal and vertical directions so as to include all non-zero values with a quantized value representing a lowest frequency component as one apex and transmits only a coded word of quantized values included in the transmission region and information of the transmission region.

12. An orthogonal transform coding apparatus as claimed in claims 1 or 7, wherein said variable length encoding means encodes orthogonally transformed components representing a low frequency level in a fixed length form and orthogonally transformed components representing a high frequency level in a variable length form.

13. An orthogonal transform coding apparatus as claimed in claims 1 or 7, wherein said variable length encoding means uses variable-length codes for orthogonally transformed components representing a low frequency level which are different from variable-length codes for orthogonally transformed components representing a high frequency level.

14. An orthogonal transform coding apparatus as claimed in claims 1 or 7, wherein the quantization width is expressed as a power of 2 or as the product of a power of 2 and a specific constant, and a means for effecting the quantization or inverse quantization comprises one of a bit shifter and combination of a bit shifter and an multiplier of said specific 15. An orthogonal transform coding apparatus as claimed in claims 1 or 7, wherein said quantizing means sorts the orthogonally transformed components into r groups including from a group representing a high frequency level up to a group representing a low frequency level, and prepares s kinds of quantization widths, thus all of the quantizers performing quantization in combination of said r groups of the orthogonally transformed components with said s kinds of quantization widths.

16. An orthogonal transform coding apparatus as claimed in claims 1 or 7, wherein said quantizing means transmits an average value of quantization errors of non-zero quantized values for every small block and corrects inversely quantized values during decoding using said average value of quantization errors.

17. An orthogonal transform coding apparatus as claimed in claims 1 or 7, wherein said quantizing means quantizes signals placed at a same position on a picture plane using quantizers having different quantization characteristics for every frame or field.

18. An orthogonal transform coding apparatus as claimed in claims 1 or 7, wherein said quantizer selecting means detects dynamic range for each small block, and then sorts each small block into a plurality of groups according to said dynamic range, and then selects a quantizer having a large quantization width for small block groups having a small dynamic range, and transmits the thus obtained result together with information showing that each small block is included in what group.

19. An orthogonal transform coding apparatus as claimed in claim 18, wherein the dynamic range detected by said quantizer selecting means for each small block is represented by a maximum value of an absolute value of the orthogonally transformed components included in each small block.

20. An orthogonal transform coding apparatus as claimed in claims 1 or 7, wherein said transmission means rearranges the quantized values of a small block in the order from a lowest frequency value to a highest frequency value in both horizontal and vertical directions and transmits a coded word of quantized values representing from a lowest frequency component up to a highest frequency component in both horizontal and vertical directions ni the order from a coded word of quantized values representing the low frequency value, and fails to transmit a code word of quantized values coming after the quantized value representing a highest non-zero frequency value using an end signal or information capable of determining a position of a last quantized value.

21. An orthogonal transform coding apparatus as claimed in claim 20, wherein said variable length encoding means encodes the quantized values in the order defined by said transmission means, and when the quantized value is 0, expresses the number of the quantized values of zero successively appeared thereto and the non-zero quantized values appeared first by one coded word.

* * * * *